US010650055B2

(12) United States Patent
Vierra

(10) Patent No.: US 10,650,055 B2
(45) Date of Patent: May 12, 2020

(54) DATA PROCESSING FOR CONTINUOUS MONITORING OF SOUND DATA AND ADVANCED LIFE ARC PRESENTATION ANALYSIS

(71) Applicant: Viesoft, Inc., San Francisco, CA (US)

(72) Inventor: Anthony Vierra, San Francisco, CA (US)

(73) Assignee: Viesoft, Inc., Walnut Creek, CA (US)

( * ) Notice: Subject to any disclaimer, the term of this patent is extended or adjusted under 35 U.S.C. 154(b) by 0 days.

(21) Appl. No.: 16/271,099

(22) Filed: Feb. 8, 2019

(65) Prior Publication Data

US 2019/0171671 A1    Jun. 6, 2019

Related U.S. Application Data

(63) Continuation-in-part of application No. 15/292,748, filed on Oct. 13, 2016, now Pat. No. 10,304,445.

(Continued)

(51) Int. Cl.
*G10L 15/00* (2013.01)
*G06F 16/9035* (2019.01)
(Continued)

(52) U.S. Cl.
CPC ........ *G06F 16/9035* (2019.01); *G06F 16/907* (2019.01); *G06F 16/9024* (2019.01);
(Continued)

(58) Field of Classification Search
CPC ..................................................... G10L 15/00
(Continued)

(56) References Cited

U.S. PATENT DOCUMENTS 6,233,557 B1 * 5/2001 Poppert ................. G10L 15/148
704/250
7,441,135 B1 * 10/2008 Chan ..................... G06F 1/3203
713/320

(Continued)

OTHER PUBLICATIONS

Final Office Action, dated Jan. 19, 2018, from corresponding U.S. Appl. No. 15/292,748.

(Continued)

*Primary Examiner* — Michael Colucci
(74) *Attorney, Agent, or Firm* — Brient IP Law, LLC

(57) ABSTRACT

A wearable sound capturing and retrieval system that includes a wearable sound capturing device that comprises a data collection device including at least one microphone configured for capturing sound data adjacent a user in at least a substantially continuous manner. The system may, for example: (1) store the captured sound data; (2) convert the captured sound data to captured textual data; (3) index data selected from: one or more segments of captured sound data and one or more segments of captured textual data; and (3) facilitate retrieval of at least a portion of the indexed data, wherein facilitating the retrieval includes (I) scanning the indexed data to identify one or more key phrases, (ii) retrieving one or more segments of indexed data that was communicated by the user at least about contemporaneously with the one or more key phrases, and (iii) saving the one or more segments of indexed data.

19 Claims, 13 Drawing Sheets

Related U.S. Application Data

(60) Provisional application No. 62/628,122, filed on Feb. 8, 2018.

(51) Int. Cl.
| | | |
|---|---|---|
| *G06F 16/901* | (2019.01) | |
| *G06F 16/9032* | (2019.01) | |
| *G06F 16/907* | (2019.01) | |
| *G06F 17/27* | (2006.01) | |
| *G10L 15/26* | (2006.01) | |
| *G06F 16/9038* | (2019.01) | |

(52) U.S. Cl.
CPC .... *G06F 16/9038* (2019.01); *G06F 16/90332* (2019.01); *G06F 17/2705* (2013.01); *G06F 17/2765* (2013.01); *G06F 17/2775* (2013.01); *G10L 15/26* (2013.01)

(58) Field of Classification Search
USPC ........... 704/4, 277, 276, 250, 236, 235, 244; 706/45, 12; 705/347, 14.67, 14.19, 14.12
See application file for complete search history.

(56) References Cited

U.S. PATENT DOCUMENTS

| | | | | |
|---|---|---|---|---|
| 8,008,563 | B1* | 8/2011 | Hastings | G09B 15/023 |
| | | | | 84/470 R |
| 8,332,232 | B2 | 12/2012 | Nickerson et al. | |
| 8,694,537 | B2* | 4/2014 | Mohajer | G10L 15/063 |
| | | | | 707/769 |
| 8,712,946 | B1* | 4/2014 | Heidenreich | G06N 5/04 |
| | | | | 706/45 |
| 9,111,413 | B2 | 8/2015 | Gagner et al. | |
| 9,111,540 | B2 | 8/2015 | Plumpe et al. | |
| 9,271,118 | B2 | 2/2016 | Russell et al. | |
| 9,432,506 | B2 | 8/2016 | Tatourian et al. | |
| 9,535,577 | B2 | 1/2017 | Spirer | |
| 9,542,958 | B2 | 1/2017 | Sendai | |
| 9,620,123 | B2 | 4/2017 | Faians et al. | |
| 9,974,467 | B2 | 5/2018 | Blahnik et al. | |
| 9,978,288 | B2 | 5/2018 | Lok et al. | |
| 10,130,287 | B2 | 11/2018 | Von Kraus et al. | |
| 2005/0033582 | A1* | 2/2005 | Gadd | G06Q 30/02 |
| | | | | 704/277 |
| 2005/0049850 | A1* | 3/2005 | Porter | G04G 11/00 |
| | | | | 704/1 |
| 2007/0141541 | A1* | 6/2007 | Chan | G09B 5/06 |
| | | | | 434/236 |
| 2008/0183678 | A1* | 7/2008 | Weston | G06F 16/9535 |
| 2009/0043573 | A1* | 2/2009 | Weinberg | G10L 17/06 |
| | | | | 704/223 |
| 2009/0091087 | A1* | 4/2009 | Wasmund | A63F 9/18 |
| | | | | 273/430 |
| 2009/0210411 | A1* | 8/2009 | Murata | G10L 15/1822 |
| 2010/0312555 | A1* | 12/2010 | Plumpe | G10L 15/065 |
| | | | | 704/231 |
| 2011/0060587 | A1* | 3/2011 | Phillips | G10L 15/30 |
| | | | | 704/235 |
| 2011/0099130 | A1* | 4/2011 | Blumberg | G09B 5/00 |
| | | | | 706/12 |
| 2011/0106721 | A1* | 5/2011 | Nickerson | G06Q 30/02 |
| | | | | 705/347 |
| 2012/0139828 | A1* | 6/2012 | Lok | G09B 7/00 |
| | | | | 345/156 |
| 2013/0337889 | A1* | 12/2013 | Gagner | G07F 17/3209 |
| | | | | 463/25 |
| 2014/0026048 | A1* | 1/2014 | Spirer | G06F 3/0484 |
| | | | | 715/716 |
| 2014/0172432 | A1* | 6/2014 | Sendai | G10L 21/10 |
| | | | | 704/276 |
| 2014/0229253 | A1* | 8/2014 | Farrar, Jr. | G06F 16/9535 |
| | | | | 705/14.19 |
| 2014/0229866 | A1* | 8/2014 | Gottlieb | H04L 65/403 |
| | | | | 715/758 |
| 2014/0316779 | A1* | 10/2014 | Russell | G10L 15/26 |
| | | | | 704/235 |
| 2014/0330563 | A1* | 11/2014 | Faians | G06Q 30/0185 |
| | | | | 704/236 |
| 2015/0227954 | A1* | 8/2015 | Jung | G06Q 30/0209 |
| | | | | 705/14.12 |
| 2016/0058336 | A1* | 3/2016 | Blahnik | A61B 5/1118 |
| | | | | 600/595 |
| 2016/0125473 | A1* | 5/2016 | Singh | G06Q 30/0271 |
| | | | | 705/14.67 |
| 2016/0135719 | A1* | 5/2016 | von Kraus | A61B 90/361 |
| | | | | 600/559 |
| 2016/0182716 | A1* | 6/2016 | Tatourian | H04M 3/436 |
| | | | | 455/413 |
| 2016/0322044 | A1* | 11/2016 | Jung | G06F 3/017 |
| 2016/0379107 | A1* | 12/2016 | Li | B25J 11/0005 |
| | | | | 706/11 |
| 2017/0140760 | A1* | 5/2017 | Sachdev | G10L 17/04 |
| 2017/0316458 | A1* | 11/2017 | Peretz | G06Q 30/0255 |

OTHER PUBLICATIONS

Hartmans, This tiny device can record everything you say and transcribe it for you, Feb. 7, 2017, 19 pages total, Retrieved from internet site http://www.businessinsider.com/senstone-kickstarter-record-everything-you-say-transcribe-it-2017-2.

International Search Report, dated Dec. 7, 2017, from corresponding International Application No. PCT/US2017/056302.

Microsoft, Cognitive Services, Microsoft.com, Retrieved from Internet on May 15, 2017: https://msdn.microsoft.com/en-us/library/mt612813.aspx.

Microsoft, Speaker Recognition API Preview, Microsoft.com, Retrieved from Internet on May 15, 2017: https://www.microsoft.com/cognitive-services/en-us/speaker-recognition-api.

Notice of Allowance, dated Jan. 15, 2019, from corresponding U.S. Appl. No. 15/292,748.

Office Action, dated Aug. 1, 2017, from corresponding U.S. Appl. No. 15/292,748.

Pavlok, Replace Bad Habits, pavlok.com, Retrieved from Internet on May 15, 2017: https://pavlok.com/?utm_expid=.flmEWv8XT5SxI9JFSXfg_A.0&utm_referrer.

Written Opinion of the International Searching Authority, dated Dec. 7, 2017, from corresponding International Application No. PCT/US2017/056302.

\* cited by examiner

DATA PROCESSING FOR CONTINUOUS MONITORING OF SOUND DATA AND ADVANCED LIFE ARC PRESENTATION ANALYSIS

CROSS-REFERENCE TO RELATED APPLICATIONS

This application is a continuation-in-part of U.S. patent application Ser. No. 15/292,748, filed Oct. 13, 2016, entitled "Wearable Device for Speech Training," and also claims priority from U.S. Provisional Patent Application Ser. No. 62/628,122, filed Feb. 8, 2018, entitled "Data Processing for Continuous Monitoring of Sound Data and Advanced Life Arc Presentation Analysis," the disclosures of which are incorporated by reference herein in their entirety.

BACKGROUND

Currently, it is difficult for individuals to track and store the ideas that they have from day to day. It is also difficult for individuals to track the progress that they make over the course of their lifetime and to compare their progress with others. Accordingly, there is a need for improved systems and methods to address these issues.

SUMMARY OF THE INVENTION

A wearable sound capturing and retrieval system, according to particular embodiments, comprises: (1) at least one processor and memory; and (2) a wearable sound capturing device that may include a data collection device that comprises at least one microphone configured for capturing sound data adjacent a user in at least a substantially continuous manner, and communication hardware for communicating the captured sound data to the at least one processor. In various embodiments, the system is configured for: (1) storing the captured sound data in memory; (2) converting one or more segments of captured sound data to one or more segments of captured textual data; (3) indexing data selected from a group consisting of: the one or more segments of captured sound data, and the one or more segments of captured textual data; and (4) facilitating retrieval by the user of at least a portion of the indexed data, wherein facilitating retrieval comprises: (i) scanning the indexed data to identify one or more key phrases comprising one or more particular word, (ii) in response to identifying the one or more key phrases, retrieving one or more segments of indexed data that was communicated by the user at least about contemporaneously with the one or more key phrases, (iii) after retrieving the one or more segments of indexed data, the processor is further configured to save the one or more segments of indexed data to memory in association with one or more categories that is associated with the one or more key phrases.

A computer system for generating a life arc, according to particular embodiments, comprises: (1) at least one computer processor and memory. In various embodiments, the system is adapted for: (1) accessing a digital memorialization of at least a substantial portion of an individual's spoken statements made over a time period of at least a plurality of month; (2) processing the digital memorialization to determine, based at least in part on the individual's spoken statements: (i) that one or more pre-determined life events have occurred; and (ii) the age of the individual when each of the respective one or more pre-determined life events occurred; and (3) displaying, to a user, a respective indication of each particular one of the pre-determined life events and a respective age of the individual when the particular pre-determined life event occurred.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

Various embodiments of utterance training computing systems and methods are described below. In the course of this description, reference will be made to the accompanying drawings, which are not necessarily drawn to scale and wherein.

DETAILED DESCRIPTION OF SOME EMBODIMENTS

Figure 1:
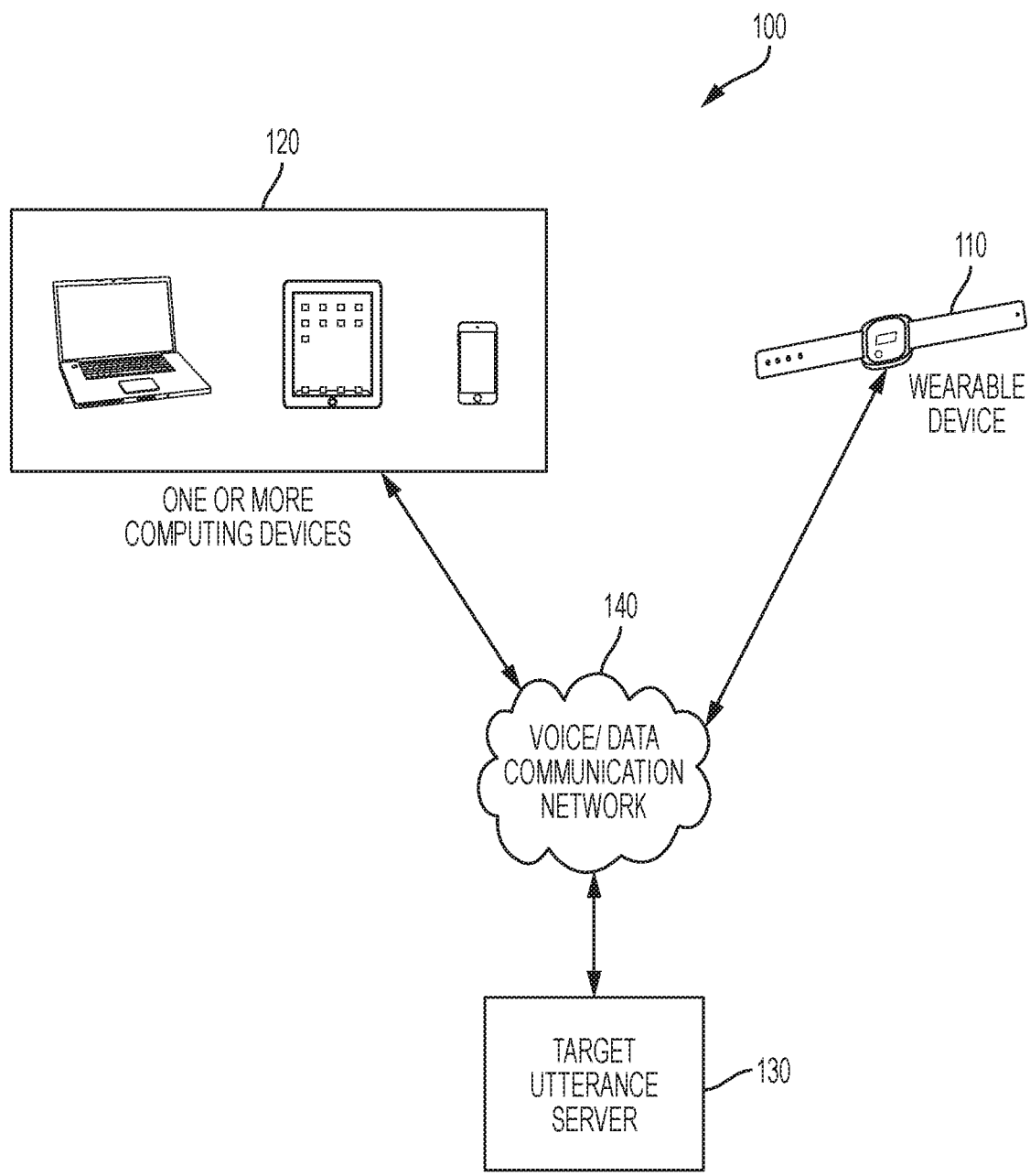
FIG. 1 is a block diagram of an Utterance Training System in accordance with an embodiment of the present system.

Various embodiments will now be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

Utterance training systems and related methods, according to various embodiments, may provide one or more responsive effects in response to detecting the use of a particular target utterance by a user. The system may, for example: (1) receive one or more target utterances from the user; (2) detect a use of one of the one or more target utterances by the user; and (3) in response, provide one or more responsive effects. In various embodiments, the system is configured to detect the use of the one or more target utterances and provide the one or more responsive effects via a wearable utterance training device.

In particular embodiments, a wearable utterance training device may comprise, for example, a necklace, watch, bracelet, or any other suitable wearable device. In particular embodiments, the wearable utterance training device may include one or more microphones to detect the utterances that the user is saying (e.g., to monitor the speech of a user). For example, the user may desire to stop using particular swear words or a filled pause, such as "uh" or "um." The user or another can provide these target utterances to the utterance training system, and the system, in response to detecting the use of one of the target utterances, may determine whether it was the user that spoke the target utterance or a different person. The target utterance system may, for example, compare a recording of the user saying the target utterance to the detected use of the target utterance to determine if it was the user's voice (e.g., as opposed to the voice of another).

In response to the system determining that it was the user who made the target utterance, the system may provide one or more responsive effects. The one or more responsive effects may include, for example: (1) providing one or more shocks to the user using the wearable utterance training device; (2) initiating a transfer of money between an account associated with the user and a third party account (e.g., automatically make a charitable donation on behalf of the user); (3) creating a public disclosure to communicate information indicating that the user uttered one or more of the target utterances (e.g., by posting the disclosure on one or more social media websites, transmitting a message to one or more other people known to the user, etc.); and/or (4) play a recording of the user's use of the target utterance. In various embodiments, the utterance training system may provide one or more positive responsive effects to incentivize the user to use particular words. For example, the user or another may create the one or more target utterances to include different types of complimentary or polite words, one or more advanced vocabulary words, one or more words in a foreign language (e.g., to promote practice when a user is learning a foreign language), etc. In this scenario, the one or more responsive effects may include, for example: (1) providing a massage or vibration to the user via the wearable utterance training device; (2) transferring of money into the user's account from a third party account; (3) etc. By providing these responsive effects in response to the user using the target utterances, the system and method may help prevent or promote, as defined by the user, particular target utterances.

Exemplary Technical Platforms

As will be appreciated by one skilled in the relevant field, the present systems and methods may be, for example, embodied as a computer system, a method, or a computer program product. Accordingly, various embodiments may be entirely hardware or a combination of hardware and software. Furthermore, particular embodiments may take the form of a computer program product stored on a computer-readable storage medium having computer-readable instructions (e.g., software) embodied in the storage medium. Various embodiments may also take the form of Internet-implemented computer software. Any suitable computer-readable storage medium may be utilized including, for example, hard disks, thumb drives, compact disks, DVDs, optical storage devices, and/or magnetic storage devices.

Various embodiments are described below with reference to block diagram and flowchart illustrations of methods, apparatuses, (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, a special purpose computer, or other programmable data processing apparatus that can direct a computer or other programmable data processing apparatus to function in a particular manner such that the instructions stored in the computer-readable memory produce an article of manufacture that is configured for implementing the functions specified in the flowchart block or blocks.

The computer instructions may execute entirely on the user's computer, partly on the user's computer, as a stand-alone software package, partly on a user's computer and partly on a remote computer, or entirely on the remote computer or server. The remote computer may be connected to the user's computer through any suitable type of network, including but not limited to: (1) a local area network (LAN); (2) a wide area network (WAN); and/or (3) a cellular network. It should be understood that a particular computer's connection to the network may be made via an external computer (for example, by connecting to the internet via a "hotspot" provided by a portable wireless device).

The computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer-implemented process (e.g., method) such that the instructions that execute on the computer or other programmable apparatus provide steps for implementing the functions specified in the flowchart block or blocks.

Example System Architecture

FIG. 1 is a block diagram of an utterance training system 100 according to particular embodiments. As may be understood from this figure, the utterance training system 100, in particular embodiments, includes: (1) a wearable device 110, that may, for example, include hardware and/or software that facilitates monitoring sound data (e.g., a user's speech), stores information, and provides electrical, vibrating, or sound stimulation; (2) one or more portable computing devices 120, which may, for example, include one or more cellular phones (e.g., a smartphone or traditional cellular phone), tablet computers, and/or laptop computers; and (3) a target utterance server 130 that may, for example, be remote from the one or more computing devices 120. The wearable device 110, one or more portable computing devices 120, and/or the target utterance server 130 may include memory that stores target utterance information for one or more users, as further described below.

The system may further include one or more voice and/or data communication networks 140 for initiating and/or mediating communication between the various system components discussed above. These one or more networks 140 may include any of a variety of types of wired or wireless computer networks such as the Internet (or other WAN), Local Area Network (or WLAN), a private intranet, a mesh network, a public switch telephone network (PSTN), or any other type of network (e.g., a network that uses Bluetooth (standard or low energy Bluetooth), beacon communication technologies (e.g., iBeacon), Zigbee, Zwave, RFID and/or near field communications to facilitate communication between computing devices).

Figure 2:
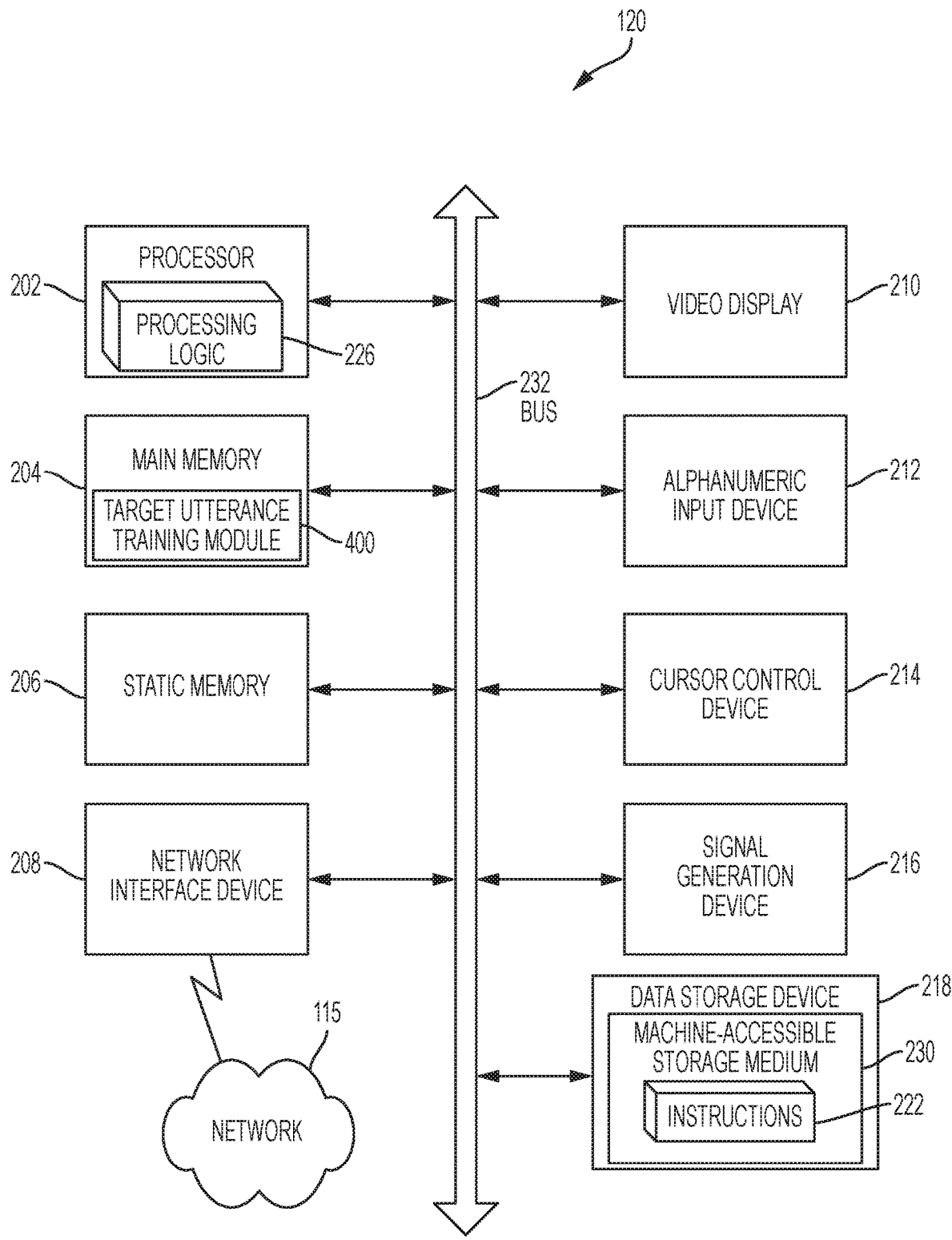
FIG. 2 is a block diagram of the Target Utterance Server of FIG. 1.

FIG. 2 illustrates an exemplary diagrammatic representation of the architecture of a target utterance server 130 that may be used within the utterance training system 100. It should be understood that the computer architecture shown in FIG. 2 may also represent the computer architecture of any one of the one or more portable computing devices 120 and/or the wearable device 110 that are shown in FIG. 1.

In particular embodiments, the target utterance server 130 may be connected (e.g., networked) to other computing devices in a LAN, an intranet, an extranet, and/or the Internet or other suitable network as shown in FIG. 1. As noted above, the target utterance server 130 may operate in the capacity of a server or a client computing device in a client-server network environment, or as a peer computing device in a peer-to-peer (or distributed) network environment. The target utterance server 130 may be a desktop personal computing device (PC), a tablet PC, a set-top box (STB), a Personal Digital Assistant (PDA), a cellular telephone, a web appliance, a network router, a switch or bridge, a physical computer server, a cloud-based logical computer server and/or any other computing device capable of executing a set of instructions (sequential or otherwise) that specify actions to be taken by that computing device. Further, while only a single computing device is illustrated, the single term "computing device" (or other such singular terminology referring to a computing device) should also be interpreted to include any collection of computing devices that individually or jointly execute a set (or multiple sets) of instructions to perform any one or more of the methodologies discussed herein.

As shown in FIG. 2, an exemplary target utterance server 130 includes a processor 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other and other system components via a bus 232.

The processor 202 represents one or more general-purpose or specific processing devices such as a microprocessor, a central processing unit (CPU), or the like. More particularly, the processor 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processor 202 may be configured to execute processing logic 226 for performing various operations and steps discussed herein.

The target utterance server 130 may further include a network interface device 208. The target utterance server 130 may also include a video display unit 210 (e.g., a liquid crystal display (LCD) or a cathode ray tube (CRT)), an alpha-numeric input device 212 (e.g., a keyboard), a cursor control device 214 (e.g., a mouse), and a signal generation device 216 (e.g., a speaker).

The data storage device 218 may include a non-transitory computer readable storage medium 230 (also known as a non-transitory computer-readable medium) on which is stored one or more sets of instructions (e.g., the utterance training module 400) embodying any one or more of the methodologies or functions described herein. The utterance training module 400 may also reside, completely or at least partially, within the main memory 204 and/or within the processor 202 during execution thereof by the target utterance server 130—the main memory 204 and the processing device 202 also constituting non-transitory computer-readable storage media. The utterance training module 400 may further be transmitted or received over a network 60 via a network interface device 208.

The network 140 although illustrated as one "cloud" for the sake of brevity and ease of understanding should be understood to include one or more LANs, one or more virtual LANs, the Internet, one or more extranets, one or more WANs and/or other any other suitable networking topologies that facilitate the movement of data from one computing device to another. As is commonly understood in the art, each of the aforementioned networks may or may not have the ability to communicate directly with each other. By way of one example, data that is destined for the computing device 120 may traverse the public Internet but once received, may then be communicated (e.g., along with other data derived from the original data) via a private LAN to the wearable device 110.

While the computing device-accessible storage medium 230 is shown in an exemplary embodiment to be a single medium, the term "computer readable medium" should be understood to include a single medium or multiple media (e.g., a centralized or distributed database, and/or associated caches and servers) that store the one or more sets of instructions. The terms "computing device-accessible storage medium" or "computer-readable medium" should also be understood to include any medium that is capable of storing, encoding, or carrying a set of instructions for execution by the computing device and that may, for example, cause the computing device to execute any one or more of the methodologies of the present invention. The terms "computing device-accessible storage medium" and "computer-readable medium" should accordingly be understood to include, but not be limited to, solid-state memories, optical and magnetic media, etc.

Exemplary Hardware System

Figure 3:
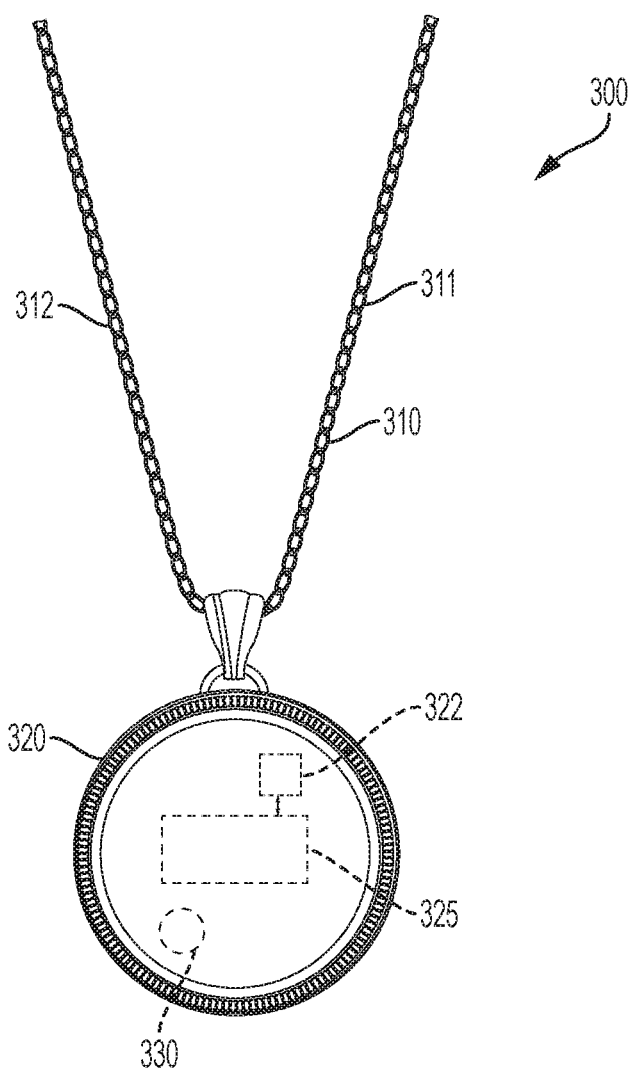
FIG. 3 is a front view of an utterance training device according to a particular embodiment.

FIG. 3 is a front view of an exemplary wearable utterance training device 300. In some implementations, the wearable utterance training device 300 may be, or include portions of the wearable device 110, portable computing device 120, and/or target utterance server 130. In the embodiment shown in this figure, the wearable utterance training device 300 includes an elongated band 310 that includes a first end 311 and a second end 312. The elongated band 310 may be a wearable accessory, such as a necklace, a bracelet, a watch, a slap bracelet, a belt, a headband, an earring, a ring, a clasp, or a skin clamp, among others. In particular embodiments, the first end 311 and the second end 312 are configured to be connected around a part of the user (e.g., around the user's neck for a necklace or around the user's wrist for a bracelet). The first end 311 and second end 312 may be connected in any manner known in the field, and may include, for example, a clasp, clip, adhesive, hook and loop fasteners, or any other type of fastener. In some embodiments, the elongated band 310 may be configured to be enclosed prior to application on the user's (e.g., a headband).

In the embodiment shown in FIG. 3, the wearable utterance training device 300 also includes one or more data collection devices 320 that include one or more microphones 322 configured to capture sound data. The one or more data collection devices 320 may also include a processor, memory, and other components, as described above with respect to FIG. 2. Power may be provided to any component of the wearable utterance training device 300 by the use of a battery, or in some embodiments, the wearable utterance training device 300 may receive power by a plug-in power supply. The data collection device 320 is connected, directly or indirectly, to the elongated band 310 by a clasp, adhesive, clip, or fastener. The one or more microphone 322 may capture sound data, for example, when the wearable utterance training device 300 is activated or electrically turned on. In other embodiments, the one or more microphone 322 may be configured to substantially continuously (e.g., continuously) monitor a user's speech.

In various embodiments, the wearable utterance training device 300 also includes communication hardware 325 that enables the wearable utterance training device 300 to transmit signals over a communication network. For example, the communication hardware may be network interface device 208, as described above in FIG. 2, or other type of communication hardware. Communication hardware 325 may be a part of the data collection device 320, connected to the data collection device 320, or separate from the data collection device 320. The communication hardware 325 may use communication network 140 to relay the received sound data obtained by the data collection device 320 to a processor at the portable computing device 120, target utterance server 130, or other component. In some embodiments, the processor may be located within the wearable utterance training device 300. In particular embodiments, the communication hardware 325 includes one or more antennae.

In response to the processor receiving the sound data, the processor is configured to identify utterances that the user uttered over a period of time (e.g., since the last time sound data was transmitted to the processor, over the last hour, day, week, or other time period). The processor can determine that particular utterances were provided by the user based on using voice recognition software or other methods. The processor may then compare the one or more utterances of the user identified over the period of time to a plurality of target utterances stored in the processor memory. For example, the user may have provided particular target utterances to a part of the utterance training system 100, and that information may be accessible by the processor for the comparison. The processor may then determine that at least one of the one or more utterances of the user over the period of time is one of the plurality of target utterances stored in the processor memory, and in response, provide a responsive effect. The processor may track a number of times the user's utterances include one of the target utterances and store that information in the processor's memory.

The responsive effect may be a negative or positive responsive effect depending on whether the target utterance provided by the user is an utterance the user is seeking to increase or decrease the frequency of. The responsive effect may be provided by the wearable utterance training device 300 or a different computer system that may be, for example, the portable computing device 120 or target utterance server 130, as further described below. The one or more responsive effects may include, for example: (1) providing a shock to the user through a stimulus component 330 of the wearable utterance training device; (2) initiating a transfer of money between an account associated with the user and a third party account; (3) creating a public disclosure to communicate information indicating that the user uttered one or more of the target utterances; (4) playing a recording of the user's use of the target utterance; and/or (5) any other suitable responsive effect.

If the responsive effect is to be a positive effect, then the responsive effect may include, for example, (1) providing a massage or vibration to the user via the wearable utterance training device; (2) transferring of money into the user's account from a third party account; (3) etc. . . . . If the responsive effect is to be a negative effect, then the responsive effect may include, for example, (1) providing shock or other unpleasant physical stimulus to the user via the wearable utterance training device; (2) transferring of money from the user's account to a third-party account; (3) etc. In various embodiments transferring money from the user's account to a third-party account may include, for example, transferring the money to a charity or other charitable organization, transfer the money to the user's savings account from a checking account, transferring the money to a college savings or other account for a friend or relative of the user, etc. These responsive effects, and others, will be further described below. The stimulus component 330 may be connected to or a part of the data collection device 320 or other portion of the wearable utterance training device 300, or may not be connected to the wearable utterance training device 300.

Operation of Exemplary System

As noted above, an utterance training system 100, according to various embodiments, is adapted to determine the use (e.g., speech) by the user of a target utterance, and provide a responsive effect based on determining the use of the target utterance.

Figure 4:
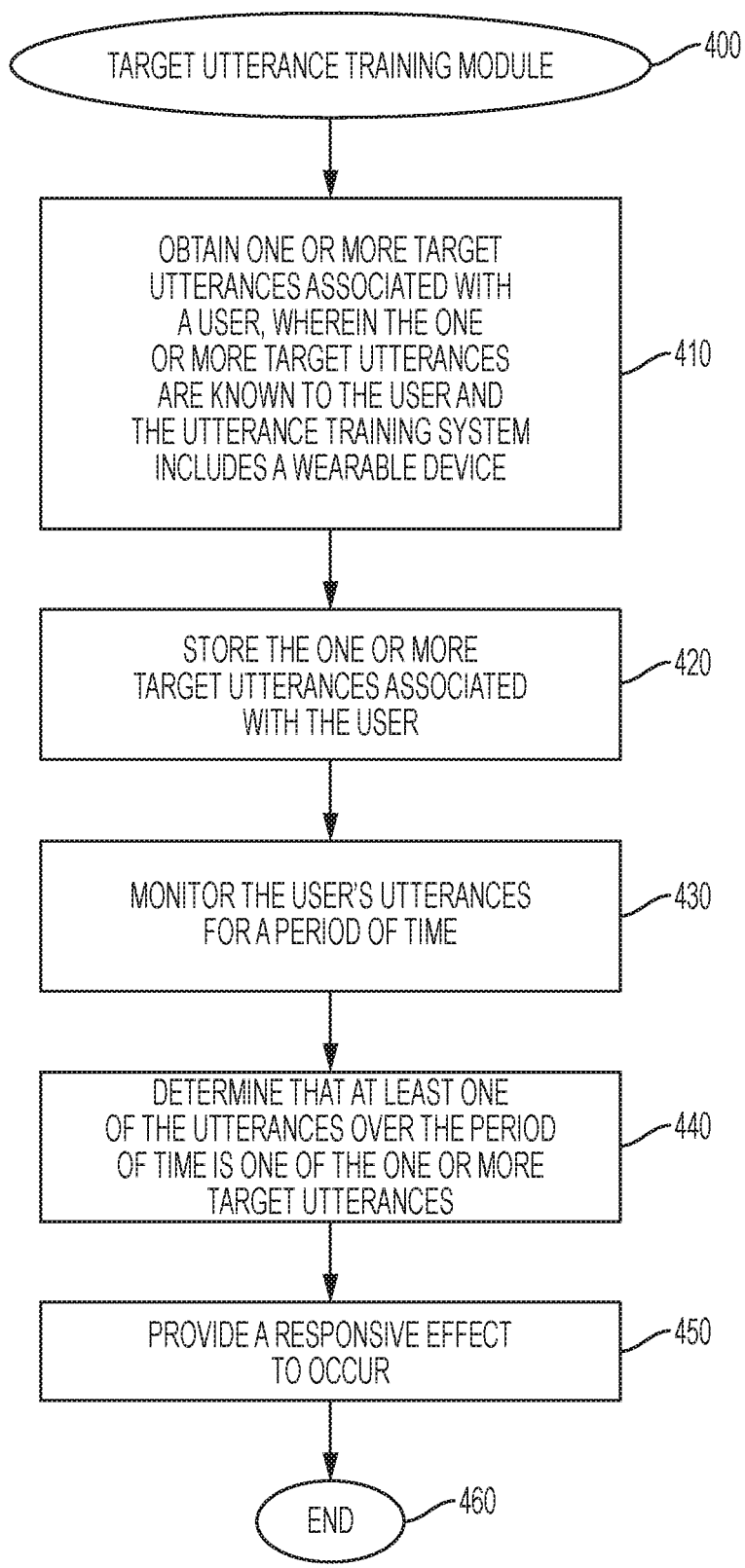
FIG. 4 is a flowchart that generally illustrates various steps executed by an Utterance Training Module according to a particular embodiment.

FIG. 4 is a flow chart of operations performed by an exemplary target utterance training module 400 according to a particular embodiment. As may be understood by one skilled in the art, various embodiments of the system described herein may omit certain of the operations described below with respect to various flow charts, perform the operations in an order other than those presented, or perform operations in addition to those described. Various of the operations described may be performed by any suitable component of the system (e.g., such as any component described above with respect to FIGS. 1, 2 and 3), and any system component may be configured to perform them.

Turning to FIG. 4, the system begins, at Step 410, by obtaining one or more target utterances associated with a user. As described above, the one or more target utterances may include words or other utterances that the user would like, or is being required, to say less frequently or not at all. For example, the user may be seeking to stop using particular swear words or filled pauses, such as "uh" or "um." Also, the target utterances may include words or other utterances that the user is seeking to say more. For example, the user or another can create the target utterances to include different types of complimentary or polite words or advanced vocabulary words. As a particular example, a user trying to learn a new vocabulary word in any language may provide the system with the new vocabulary word as a target utterance that the user would like to use within a certain time frame (e.g., the user may desire to use a particular new vocabulary word every day or within a week of the entry of the new vocabulary word into the system).

A user or another may provide the one or more target utterances to the target utterance server 130 (e.g., using a software application or other suitable user interface). These one or more target utterances may be provided directly to the target utterance server 130 or another component of the utterance training system 100, such as the wearable device 110 or a portable computing device 120. For example, the user may input a particular target utterance by providing a spelling of the target utterance, speaking the target utterance into one or more microphones). The user may also identify whether each target utterance is an utterance that should have a positive or negative responsive effect, as further described below. The wearable device 110 and portable computing device 120 may communicate with the target utterance server 130, or one another, via network 140, as described above.

In various embodiments, the wearable device 110 is configured to be attached to the user (e.g., around the user's neck, wrist, pinned to the user, or connected to an accessory of the user). In particular embodiments, the wearable device 110 comprises a necklace, a bracelet, a belt, a headband, an earring, a ring, a clasp, a skin clamp, or any other suitable wearable device. The wearable device 110 is at least in electronic communication with a processing device, which may be a component of the wearable device 110 itself or a portable computing device 120 (e.g., a smart phone of the user). The electrical communication may be a wired connection within wearable device 110, or may also be communication over network 40. In some implementations, wearable device 110 may be the wearable utterance training device 300, and/or include similar components. Additionally, the wearable device 110 may include a stimulus component that is similar to stimulus component 330.

In particular embodiments, the user may provide the target utterances by speaking each of the target utterances into a microphone of a component of the utterance training system 100, such as the wearable device 110 or portable computing device 120. The microphone may capture the sound data, and the system may use the captured sound data to create an acoustic profile for each of the target utterances provided by the user. In some implementations, the user knows the target utterances they are providing, and may provide the target utterances by inputting text to spell or otherwise identify each target utterance when prompted. The text input may be provided via a use of a keyboard, keyboard interface, cursor, mouse, or other type of selection on the wearable device 110, portable computer 120, or other component of the utterance training system 100. For example, the user may provide each target utterance by use of a keyboard (or keyboard interface) on the portable computer 120 of the user.

Additionally, in some implementations, the target utterance system 100 may provide selection options to the user at an interface (e.g., a display portion of a portable computer 120) where the user can select the target utterances from a list or other displayed collection. The target utterance system 100, for example, at the target utterance server 130, may have a collection of target utterances that can be provided to the user for selection. This collection may be based on target utterances that other users have input to the target utterance system 100 for themselves, information that the target utterance system 100 has about the user (e.g., age, location, among others), and/or default target utterances stored in the target utterance system 100 (e.g., from a dictionary or other suitable source).

Continuing to step 420, the one or more target utterances provided or selected by the user, or another, are stored. The target utterances may be stored at the target utterance server 130 or in another component of the target utterance system 100. For example, the target utterances may be stored in the portable computer 120 of the user, or in a storage component of the wearable device 110. Additionally, in some implementations, at least a portion of the target utterance server 130 may be stored on one of the wearable device 110 or portable computer 120. In particular embodiments, the one or more target utterances are stored in memory associated with any suitable system component described herein.

In particular embodiments, the target utterances are stored for the specific user, and the target utterances may be associated with a user profile of the user. The user profile may also include an identification of the one or more wearable devices 110 of the user and the one or more portable computers 120 of the user. Information for the user profile, including a setting of the target utterances, may be accessed by the user on a portable computer 120 (e.g., via an internet web browser or a software application). In some embodiments, the system is configured to enable the user to add, change, or delete information from the user profile. For example, the user may change the target utterances by adding or deleting particular target utterances, or the user can change, by adding or deleting, wearable devices 110 or portable computers 120 associated with the user (e.g., when the user obtains a new portable computer or gives away a portable computer 120).

At step 430, the utterance training system 100 monitors the user's utterances for a period of time. The user may activate the utterance training system 100 to monitor or the user may apply certain parameters for when the utterance training system 100 is to monitor. The parameters may include, for example, particular days or times of day, a location or type of location of the user (e.g., at home), randomly activate the monitoring, among others. The period of time may be a set period (e.g., twenty minutes) or varied period (e.g., as long as the device is connected to the Internet).

In various embodiments, the utterance training system 100 includes one or more microphones that capture sound data of the user's utterances in the period of time. For example, the wearable device 110 may include a microphone and store the captured sound data, or transmit the captured sound data to the portable computer 120 of the user or the target utterance server 130. In some implementations, a portable computer 120 includes a microphone that captures the sound data of the user's utterances during the time period. The captured sound data may be either pushed or pulled to the desired destination of the sound data for storage and analysis. In various embodiments, the one or more microphones are configured to continuously monitor the user's speech during the period of time indicated by the user.

The system, in various embodiments, may analyze the sound data at the target utterance server 130 or in a component of the user's portable computer 120. In some embodiments, the utterance training system 100 determines that the captured sound data is an utterance provided by the user, and then the utterance training system 100 converts the captured sound data to text, for example, using speech-to-text software to convert the captured sound data to text. In some implementations, an acoustic profile is created for the captured sound data in order to compare the created acoustic profiles or the captured sound data to the acoustic profile of the target utterances that were provided by the user. The utterance training system 100 may compare the sound data that was captured during the period of time to a stored sample of the user's voice in order to determine whether an utterance that is provided in the sound data is an utterance (e.g., a favored or disfavored utterance) that was provided by the user. If the utterance training system 100 determines that the utterance in the sound data was not provided by the user, then the utterance training system 100 disregards that portion of the sound data for future analysis.

At step 440, the utterance training system 100 determines that an utterance provided by the user is one of the target utterances. In the analysis, the utterance training system 100 may compare the text of each utterance provided by the user in the certain time period to the text of each of the target utterances identified by the user. Alternatively, or in addition, the utterance training system 100 may compare the acoustic profile of each utterance provided by the user in the certain time period to the acoustic profile of each of the target utterances identified by the user. In making this comparison, the system may use an analysis to map the sound waves and other sound data that is part of each acoustic profile, and the utterance training system 100 may use any type of audio comparison software to perform the analysis.

At step 450, the utterance training system 100 provides a responsive effect to occur based on determining that an utterance provided by the user is one of the target utterances. The responsive effect may be a negative or positive responsive effect depending on whether the target utterance provided by the user is an utterance the frequency of which the user is seeking to increase or decrease. As previously described, the user may select, for each target utterance, whether the responsive effect is to be positive or negative. The system, in various embodiments, is configured to provide the responsive effect via the wearable device 110 or a different computer system that may be, for example, the portable computing device 120 or target utterance server 130, as further described below.

In particular embodiments, the system provides the responsive effect by, for example: (1) providing a shock to the user through a stimulus component of the wearable device 110; (2) initiating a transfer of money between an account associated with the user and a third party account (e.g., a friend or supervisor of the user); (3) creating a public disclosure to communicate information indicating that the user uttered one or more of the target utterances (e.g., by automatically creating a social media post indicating that the user said the particular target utterance, as further described below with respect to FIG. 8); (4) playing a recording of the user's use of the target utterance (e.g., on the wearable device 110 or a portable computer 120 of the user) or playing any other suitable sound (e.g., a beep, horn, siren, etc. in a loud manner to embarrass the user) and/or (5) taking any other suitable action to provide any suitable responsive effect. Additionally, in some implementations, the system enables the user to customize the responsive effect that is provided, and the user may use any component of the target utterance system 100 to provide the responsive effect or initiate the responsive effect outside of the target utterance system 100.

In embodiments in which the responsive effect is a positive effect, then the responsive effect may include, for example: (1) providing a massage or vibration to the user via the wearable device 110; (2) initiating a transfer of money into the user's account from a third party account; (3) creating a public disclosure to communicate information indicating that the user uttered one or more of the target utterances (e.g., automatically creating a social media post indicating that the user said the particular target utterance, as further described below with respect to FIG. 8), or playing a recording of the user's use of the target utterance (e.g., on the wearable device 110 or a portable computer 120 of the user).

In particular embodiments, the system is configured to provide the responsive effect substantially immediately in response to the user stating an utterance that is one of the target utterances. In other embodiments, the system is configured to provide the responsive effect at a later time. At step 460, the process ends.

Figure 5:
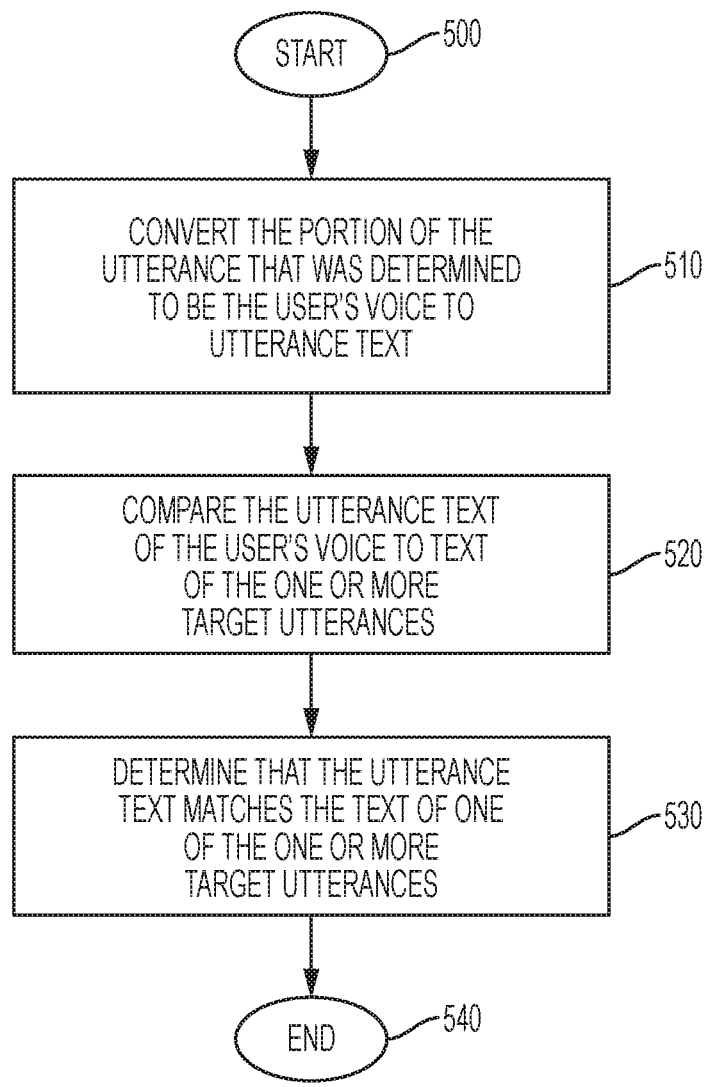
FIG. 5 is a flowchart that generally illustrates various steps executed by the Utterance Training Module to determine the use by the user of a target utterance, according to a particular embodiment.

FIG. 5 is a flowchart that generally illustrates various steps executed by the utterance training module 400 to determine the use by the user of a target utterance, according to a particular embodiment. The process begins at step 510, by converting the portion of the utterance that was determined to be the user's voice to utterance text. As previously described, this may be performed by using speech-to-text software in order to convert the captured sound data to text.

At step 520, the system compares the converted text that transcribes the user's utterance text to text of each of the target utterances. The system may perform this comparison using the target utterance server 130 or another component of the utterance training system 100, such as the wearable device 110 or a portable computing device 120. In other embodiments, the system may perform this comparison using any type of text comparison software. In some implementations, when the user has identified a target utterance that does not have an identified spelling (e.g., slang terms), the user may provide the spelling and speak the word to the target utterance system 100 in order to provide the correct mapping between the way a word sounds and its spelling for later use by the system in identifying target utterances. For example, the user may identify the slang term, "wuz up" as a target utterance. In response to the system identifying this utterance as a target utterance, the system may prompt the user to input the spelling of that term and/or request that the user speak the utterance in order to provide the mapping.

At step 530, in response to the target utterance system 100 comparing the utterance text to the text of target utterances, the system may determine that the utterance text matches the text of the one or more target utterances. In some implementations, the target utterance system 100 may include a level of confidence associated with the matching between the utterance text and the text of target key words. The level of confidence may be provided in a similarity score between the text of the target utterances and the utterance text. For example, the similarity score may reflect a similarity between the number of letters that are the same and at the same position on the text. Upon determining that the utterance text sufficiently matches the text of the one or more target utterances, the target utterance system 100 may provide a response effect, as described above.

Figure 6:
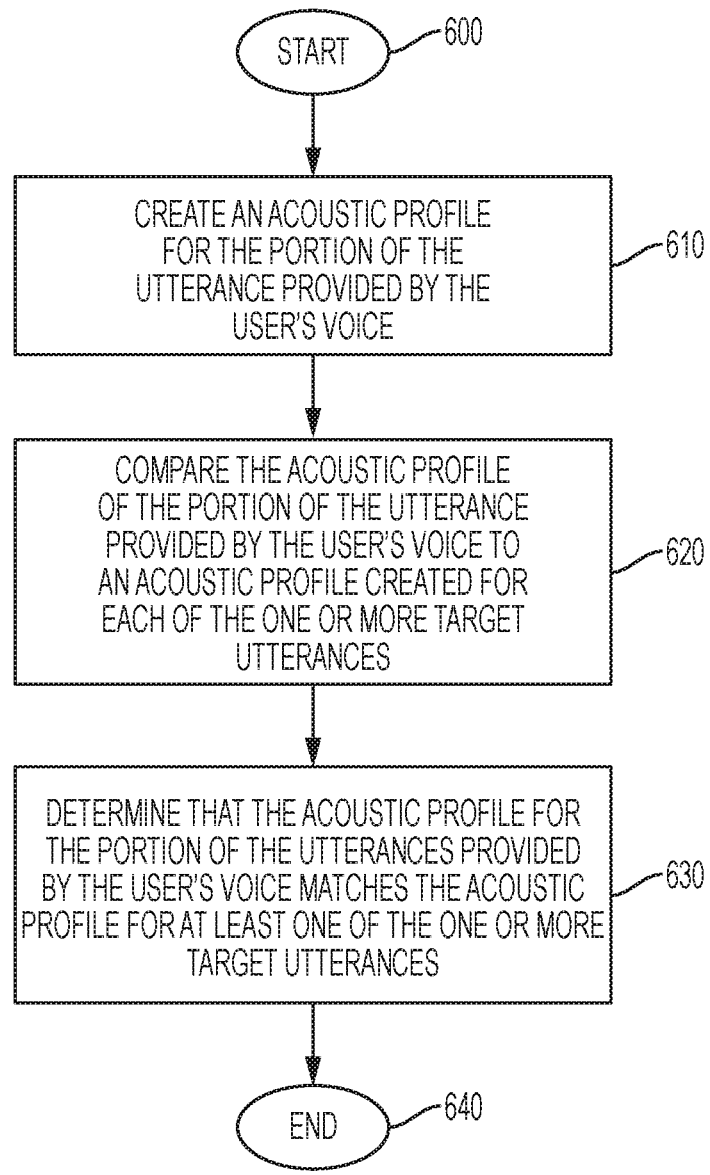
FIG. 6 is a flowchart that generally illustrates various steps executed by the Utterance Training Module to provide an analysis of an acoustic profile of a user, according to a particular embodiment.

FIG. 6 is a flowchart that generally illustrates various steps executed by the utterance training module 400 to provide an analysis of an acoustic profile of a user, according to a particular embodiment. The process begins at step 610 by creating an acoustic profile for the portion of the utterance provided by the user's voice. The acoustic profile may include the sound data for each utterance provided by the user's voice. As previously described, the utterance training system 100 may use voice recognition software to detect the user's voice, or any other method to detect the user's voice.

For example, the utterance training system 100 may detect the user's voice by identifying the voice that is closest to the microphone that is part of the wearable device 110 or the portable computer 120 of the user. Additionally, the acoustic profile for each utterance of the user may include sound wave data or any other identifier of the utterance.

At step 620, the utterance training system 110 compares the acoustic profile for the portion of the utterance provided by the user's voice to an acoustic profile for each of the one or more target utterances. At the time of the user identifying and providing each target utterance, an acoustic profile may be created for that utterance. This acoustic profile may be stored in the target utterance server 130 or another component of the utterance training system 100, such as the wearable device 110 or a portable computing device 120. The acoustic profile for each target utterance may include the same information that is part of the acoustic profile for each utterance provided by the user's voice discussed in step 610.

At step 630, in response to the target utterance system 100 comparing the acoustic profile for the portion of the utterance provided by the user's voice to an acoustic profile for each of the one or more target utterances. The system may determine that the acoustic profile for the portion of the utterance provided by the user's voice matches the acoustic profile for at least one of the one or more target utterances. In some implementations, the target utterance system 100 may have a level of confidence associated with the matching between the acoustic profile for the utterance provided by the user's voice and the acoustic profile for at least one of the target utterances. The level of confidence may be provided in a similarity score, as described below with respect to FIG. 7.

In response to determining that the acoustic profile for the portion of the utterance provided by the user's voice matches the acoustic profile for at least one of the one or more target utterances, the utterance training system 100 may provide a response effect, as described above. If the system determines that the acoustic profile for the portion of the utterance of the user does not match the acoustic profile for at least one of the target utterances, then the utterance training system will not provide a responsive effect. Additionally, in some implementations, if the utterance training system 100 is unsure or not sufficiently sure that the utterance provided by the user's voice matches a target utterance, then a responsive effect will not occur.

Figure 7:
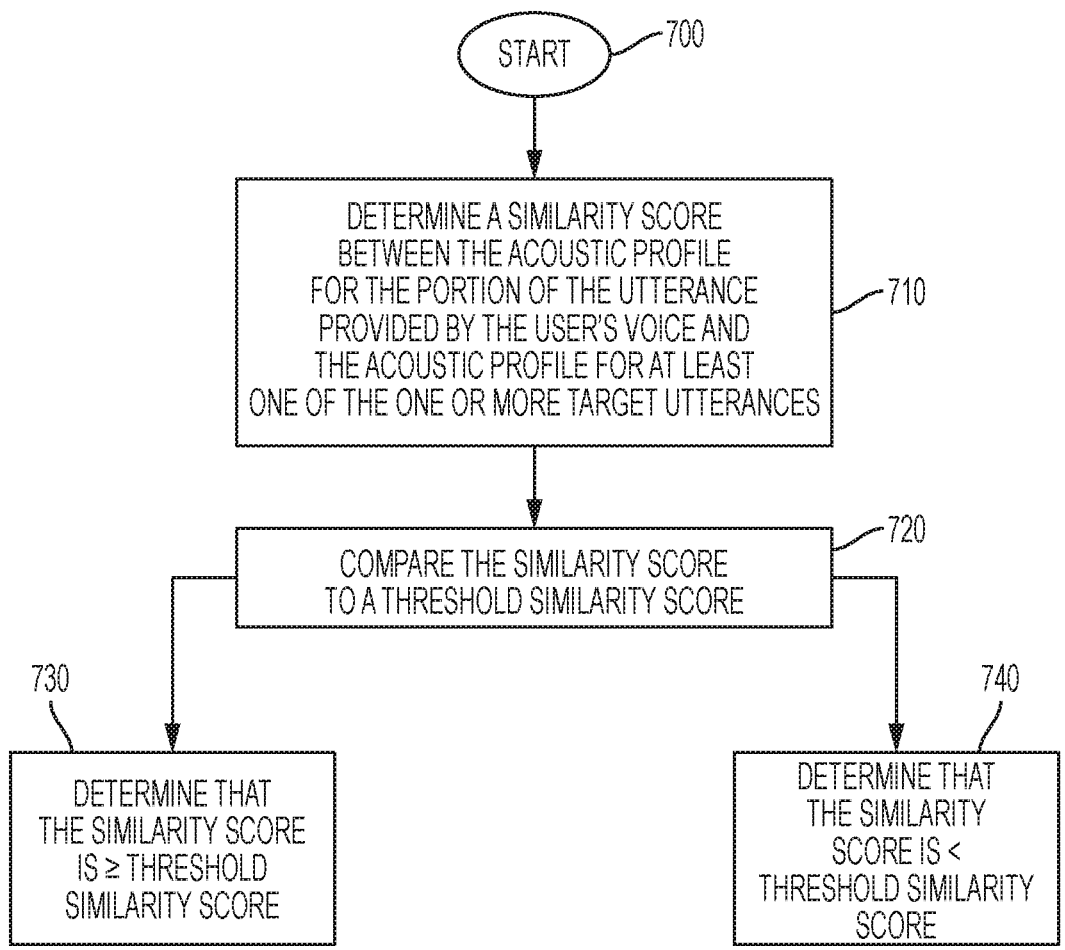
FIG. 7 is a flowchart that generally illustrates various steps executed by the Utterance Training Module to provide an analysis of an acoustic profile of a user based on a similarly score, according to a particular embodiment.

FIG. 7 is a flowchart that generally illustrates various steps executed by the utterance training module 400 to provide an analysis of an acoustic profile of a user based on a similarity score, according to a particular embodiment. The process begins at step 710 where the utterance training system 100 determines a similarity score between the acoustic profile for the portion of the utterance provided by the user's voice and the acoustic profile for at least one of the one or more target utterances. The similarity score may be based on any type of comparison between the acoustic profile for the user's utterance and the acoustic profile for the target utterance. For example, in some implementations, the system may perform a mapping between the sound data, or sound waves, of the user's utterances and those of the target utterances. The similarity score may be based on a scale (e.g., 1 to 100), identifying a certain number of similarities or differences (e.g., a certain number of similarities or differences in the sound waves for the user's utterance and the target utterances), or any other scoring method.

At step 720, the utterance training system 100 compares the determined similarity score to a threshold similarity score. The threshold similarity score may be provided by the user, or the utterance training system 100 may set the threshold similarity score. The threshold similarity score may be set at a low threshold to initiate the responsive effect more often, but likely initiate a greater number of false positives (e.g., provide the responsive effect when the user did not utter a target utterance). In various embodiments, the threshold similarity score may be set at a high threshold to prevent the initiation of the responsive effect more often, but this may provide a greater number of false negatives (e.g., not provide the responsive effect when the user did in fact utter a target utterance). This similarity score may be changed within the target utterance system 100 by the user or automatically by the target utterance system 100.

At step 730, the utterance training system 100 determines that the similarity score meets the threshold similarity score, and, in response, provides the responsive effect. If, in response to comparing the similarity score to the threshold similarity score, the similarity score does not meet the threshold similarity score, then, at step 740, the utterance training system 100 does not provide the responsive effect.

Figure 8:
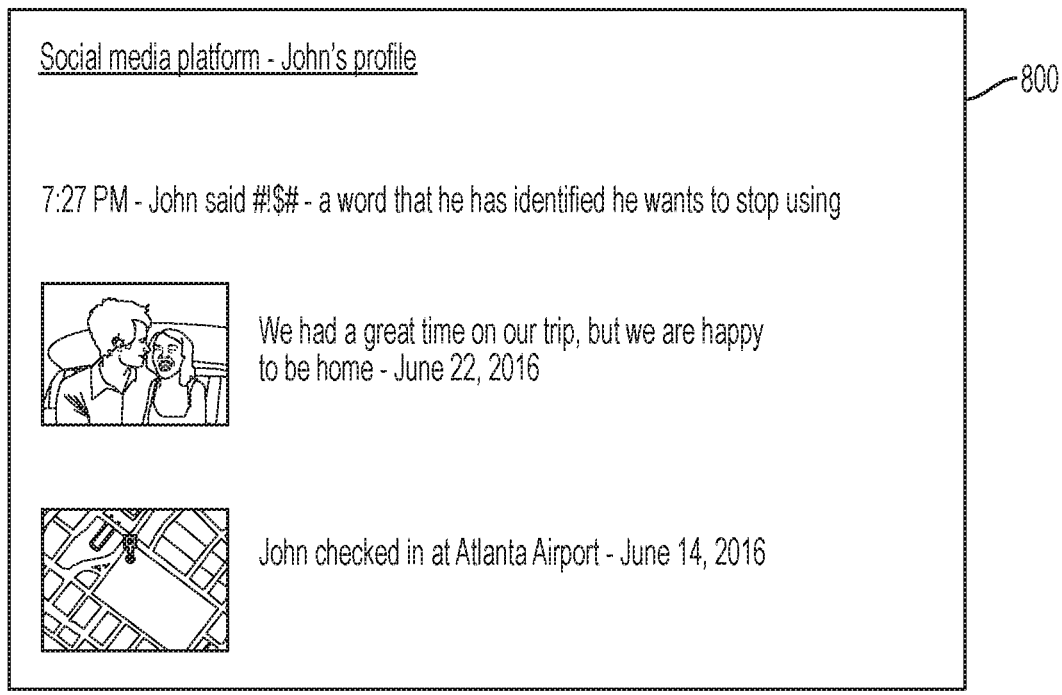
FIG. 8 is an example screen shot of a graphical user interface of a responsive effect provided by a system according to a certain embodiment.

FIG. 8 is an example screen shot of a graphical user interface 800 of a responsive effect provided by a target utterance system according to a certain embodiment. FIG. 8 is an example of the responsive effect of creating a public disclosure to communicate information indicating that the user uttered one or more of the target utterances. Specifically, FIG. 8 is an example of automatically creating a social media post indicating that the user stated a particular target utterance (e.g., as a responsive effect). The utterance training system 100 may use information that is provided by the user related to a social media platform of the user. Access to this information may be allowed or disallowed by the user. The utterance training system 100 may use the target utterance server 130 and/or portable computer 120 of the user to access the social media platform of the user. Upon the utterance training system 100 detecting that the user stated a target utterance, the utterance training system 100 may provide a responsive effect that accesses the user's social media platform and provides a post, or other content, indicating that the user stated a particular utterance. In some implementations, the post or other content may not indicate the particular utterance that the user stated, but it may, for example, state that the user stated an utterance that the user is either attempting to use less frequently or more frequently. As seen in FIG. 8, the system may automatically create the post and add the post to the user's profile at the social media platform. In other implementations, the system may prompt the user to approve the post or content prior to presentation on the user's social media platform.

Continuous Monitoring and Life Arc

As discussed above, the wearable sound capturing and retrieval system and related methods, according to various embodiments, may include a wearable sound capturing device (e.g., wearable device 110) that is configured for capturing sound data adjacent a user in at least a substantially continuous manner. The system stores the captured sound data, and can be converted to textual data (e.g., via voice to text software). Further, the captured sound data and/or textual data can be indexed and sorted into one or more segments of data. In some implementations, the data may be segmented into pre-determined time segments (e.g., seconds, minutes, hours, or days), or subject matter of the sound data. Additionally, each of the one or more indexes can be created based on a time associated with each segment data (e.g., a time when the segment of sound data was captured), or the terms included in each of the segments.

Additionally, the system facilitates retrieval of the captured sound data and/or captured textual data. For example, the user may wish to use the system to listen to segments of captured sound data relating to a particular topic (e.g., based on the use of particular words), or segments of captured sound data that were captured in a particular time period. The user may provide input, via voice or text input, of one or more key phrases (e.g., "Great idea"), and in response, the system will access the index to retrieve one or more segments of captured sound data and/or captured textual data that include the key phrase. Moreover, after retrieving the one or more segments of indexed data, the system can save the one or more segments of indexed data to memory in association with one or more categories that is associated with the one or more key phrases. The categories can be a grouping for key phrases that have one or more shared characteristics. For example, the key phrase "meeting with Jim" may be included in a "Work" category.

Further, the system can process the indexed data to determine that one or more pre-determined life events have occurred. The pre-determined life events can include events, such as marriage, birth of a child, first job, graduation from school, earning predetermined amount of money, and retiring, among others. The system can also determine the age of the individual when each of the respective one or more pre-determined life events occurred (e.g., the user was thirty years old when their first child was born). The pre-determined life events can include habits of the user or a third party (e.g., how much the individual exercises in a period of time, when the individual wakes up or goes to bed, etc.).

The system can also provide a graphical user interface displaying a respective indication of particular pre-determined life events and a respective age of the individual when the particular pre-determined life event occurred, which can include a life arc that is presented as a graph, chart, table, or any other type of representation to indicate the particular pre-determined life events and a respective age of the individual, or other time indication, when each particular life event occurred.

Additionally, the system can receive at least one search criteria specifying one or more pre-determined life events of a third party (which may include one or more other individuals). For example, the user may provide a search criteria indicating the life events of graduating from college and selling a first company for a particular individual (e.g., Elon Musk). In response, the system can access one or more databases that include information related to the third party. Further, in some embodiments, the system can generate a life arc display that can include a display comparison between the user and the identified third party regarding each particular identified pre-determined life event along with a respective age of the user and the third party and/or a time period (e.g., a year) when each of the particular pre-determined life events occurred for the user and the third party, respectively.

By the system being configured to substantially continuously monitor and capture statements provided by the user, the system can facilitate access to the sound data and/or written form of the statements. Additionally, the system can include a project management system that enables the user to search and prioritize particular items and events (e.g., based on the key phrases) among one or more categories without the user being required to actively recall, write down, or otherwise track their statements for future retrieval. Further, by the system providing a life arc display for the user to track their life events in comparison to another, perhaps very successful, individual, the user can be provided information to identify patterns to model (e.g., if the individual is successful) or not model (e.g., if the user does not want to be on the life track of the particular individual). Moreover, the life arc display can act as an inspirational or motivational tool for the user when seeing accomplishments (e.g., starting a company) or habits (e.g., waking up at 4:30 A.M. every day) of individuals they respect shown in the life arc display.

Figure 9:
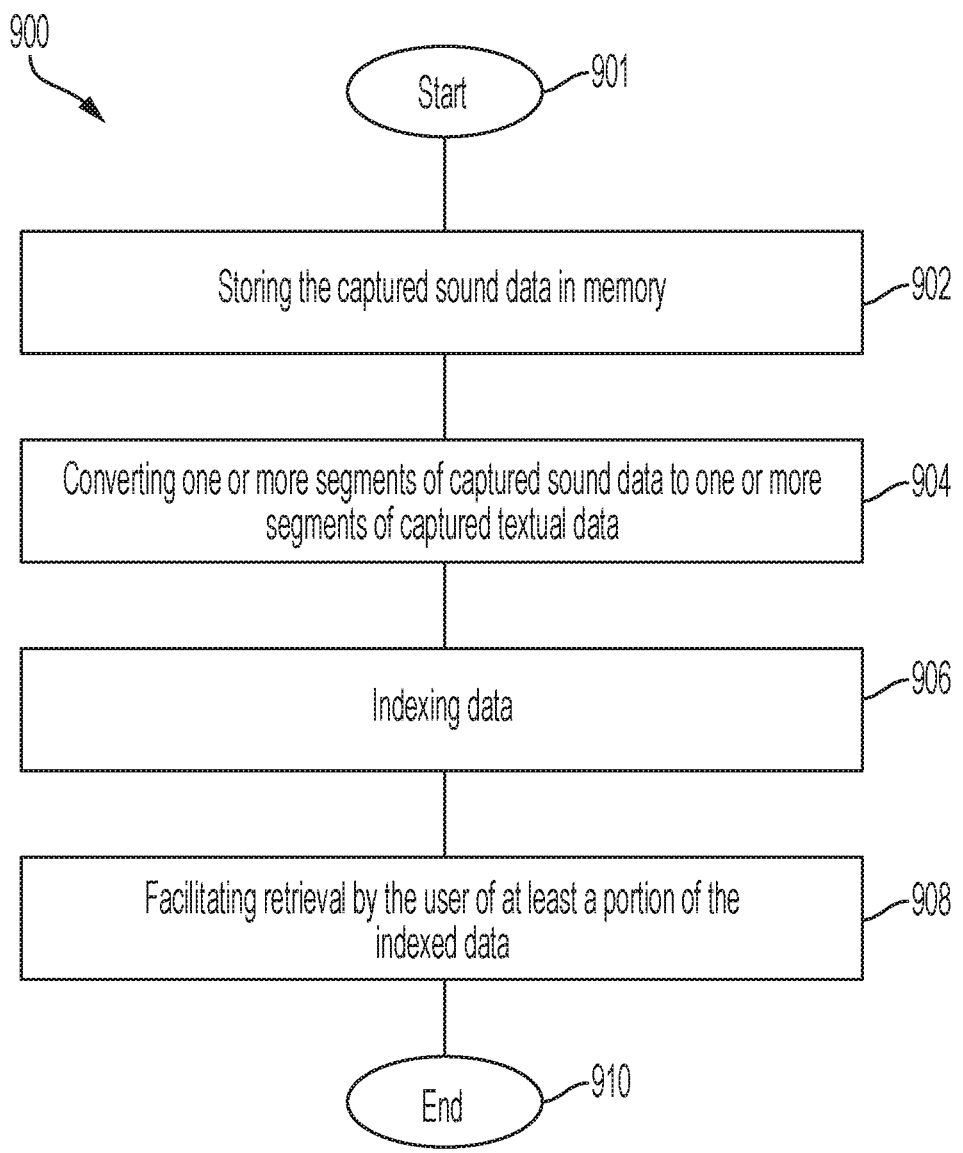
FIG. 9 is a flowchart that generally illustrates various steps executed by a sound retrieval module according to a particular embodiment.

FIG. 9 shows an example process performed by a sound retrieval module 900, which may, for example, be executed by one or more computing devices of the system. In exemplary embodiments, a server (e.g., server 130) in conjunction with a wearable device (e.g., wearable device 110) and/or client computing device having a browser (e.g., computing device 120), may execute the sound retrieval module 900 through a network (e.g., network 140). In various exemplary embodiments, the sound retrieval module 900 may call upon other modules to perform certain functions. In exemplary embodiments, the software may be organized as a single module to perform various computer executable routines.

At step 901, the system initiates the sound retrieval module 900. Next, at step 902, the system, in executing the sound retrieval module 900, stores captured sound data in memory. The wearable sound capturing device may capture the sound data. The wearable sound capturing device may be, or include components of, the wearable device 110 or the wearable utterance training device 300. Accordingly, the wearable sound capturing device may, for example, include hardware and/or software that facilitates monitoring and capturing sound data (e.g., a user's speech) and storing information, including sound data. In some implementations, the wearable sound capturing device can include one or more sensors, which are communicatively connected to the hardware and/or software components of the wearable sound capturing device. The one or more sensors are configured to detect particular movements (indicating one or more particular activities) of the user and a location of the user (e.g., using a GPS receiver).

The wearable sound capturing device also includes one or more data collection devices (e.g., data collection device 320) that include one or more microphones (e.g., microphone 322) configured to capture sound data. The one or more microphones may be configured to capture sound data adjacent a user in at least a substantially continuous manner (e.g., 60% of the user's statements). In particular implementations, the user can select particular time periods for the wearable sound capturing device to capture sound data, the user can manually select whether the wearable sound capturing device is presently set to capture sound data or not, the wearable sound capturing device can be configured to stop capturing sound data when the user has not spoken for a pre-determined period of time (e.g., five minutes) and/or to begin capturing sound data when the wearable sound capturing device identifies that the user has spoken. In various embodiments, the wearable sound capturing device also includes communication hardware (e.g., 325) that enables the wearable sound capturing device to transmit signals over a communication network. The captured sound data may be stored at a server (e.g., server 130) or in another component of the system. For example, the captured sound data may be stored in the portable computer 120 of the user, or in the wearable device 110 (e.g., in suitable computer memory). In particular embodiments, the captured sound data is stored in memory associated with any suitable system component described herein. The captured sound data may be stored as a digital recording.

At step 904, the captured sound data is converted to textual data. The sound retrieval module 900 may divide the captured sound data into one or more segments of data. The segments may be separated into discrete sub-segments of any suitable length (e.g., seconds, minutes, hours, or days), or subject (e.g., a first segment for subject A (personal career information) and a second segment for subject B (family life information)). Also, in some implementations, the segments can be divided based on the location of the user. For example, if the user is at home before work, then a first segment of data may be associated with that location, and a second segment may be associated with the user being at work. In various embodiments, the system may be adapted to automatically segment the sound data in response to the user changing locations.

Further, the system may base segment divisions, at least in part, on the time of day that the utterances were recorded. For example, when the user is at home in the morning, a first segment may be associated with this time and location, and when the user returns home from work in the evening, a different segment of data may be associated with this time and location because the user is in the particular location at a different time. The wearable sound capturing device or another component of the system may use GPS or other types of location information to detect the location of the user.

The sound retrieval module 900 may then convert the one or more segments of sound data to text by the use of voice to text software or other implementations. Additionally, when the captured sound data is converted to text, the converted text is stored as captured textual data, as this data provides a text version of what was spoken by the user and around the user (e.g., surrounding sounds or other individuals speaking). The captured textual data (e.g., spoken sound data that has been converted into text form) may be stored in segments, as described above with the captured sound data. In some implementations, each segment of sound data may be associated with a respective segment of captured textual data.

At step 906, the sound retrieval module 900 indexes the one or more segments of captured sound data and/or the one or more segments of captured textual data. Each of the one or more indexes can be created based on a time associated with each segment of captured sound data (e.g., a time when the segment of sound data was captured) and/or captured textual data, or the terms included in each of the segments of captured sound data and/or segments of captured textual data, among others. For example, for each instance of the use of the term "idea" or phrase "great idea," the index can identify the one or more segments of captured sound data and/or captured textual data that include that particular term or phrase. Further, the sound retrieval module 900 can index each term and phrase included in the segments of captured sound data and captured textual data. The index associated with the captured sound data can be based on text and/or the captured sound. In some implementations, the captured sound data may create and use different indexes from the captured textual data, but in other implementations, these may be the same indexes.

At step 908, the system, in executing the sound retrieval module 900, facilitates retrieval of at least a portion of the indexed data. The user may wish to use the system to listen to segments of captured sound data that relate to a particular topic or include a particular word, or segments of captured sound data that were captured in a particular time period. Additionally, or alternatively, the sound retrieval module 900 may facilitate the retrieval of the captured textual data that was indexed. The user may provide input of one or more key phrases that include one or more particular words, and in response, the sound retrieval module 900 can access the one or more indexes to retrieve one or more segments of captured sound data and/or one or more segments of captured textual data that include the key phrase that was provided. In some implementations, the sound retrieval module 900 can also retrieve additional segments of captured sound data or captured textual data that were communicated in a contemporaneous manner, for example, in a similar time frame, with the segment of captured sound data or captured textual data that include the key phrase.

For example, the user may provide the system with the key phrase "great idea," and the system will scan the indexed data to identify the one or more segments of indexed data (i.e., indexed captured sound data and/or indexed captured textual data) that include the phrase "great idea." The system will retrieve each segment of indexed data that includes the key phrase, and present the one or more segments to the user—for example, in a graphical user interface that enables the user to read or listen to the retrieved segment of indexed data.

Additionally, the system can retrieve one or more segments of indexed data that were captured substantially contemporaneously with (e.g., at about the same time as) each segment of indexed data that includes the key phrase (e.g., one or more segments of indexed data that correspond to spoken utterances that were captured immediately before and/or after the key phrase). Additionally, after retrieving the one or more segments of indexed data, the sound retrieval module 900 can save the one or more segments of indexed data to memory in association with one or more categories that are associated with the one or more key phrases. The categories can include, for example, a grouping for key phrases that have one or more shared characteristic. For example, the key phrase "meeting with Jim" may be included in a "Work" category, and the key phrase "buy apples" may be included a "Groceries" category. The system can provide a default set of categories, and in some implementations, the user can add or modify the set of categories. Moreover, the categories may be placed in one or more sub-categories (e.g., the "Groceries" category may be a sub-category of "Items to Purchase"). Accordingly, the system can include, and/or function as, a project management system that enables the user to search for and prioritize particular events (e.g., based on the key phrases) among one or more categories.

Moreover, in various embodiments, the user is not required to provide a key phrase, and may select one or more categories or sub-categories to see information related to one or more segment of captured data within that particular category or sub-category. Additionally, the user may filter the results in each category (e.g., based on a time domain).

Further, in some implementations, the system, in executing the sound retrieval module 900, can process the indexed data to determine that one or more pre-determined life events have occurred. The pre-determined life events can include life events for an individual, such as marriage, the birth of a child, first job, graduation from high school or college, earning a specified amount of money, and/or retirement, among others (as will be further discussed below). The sound retrieval module 900 can determine the age of the individual when each of the respective one or more pre-determined life events occurred. For example, the indexed data may include a segment of captured sound data and/or captured textual data identifying that the user stated "I got married when I was 25 years old," and another segment of indexed data identifying that the user stated "I graduated from college when I was 23 years old." Moreover, the sound retrieval module 900 can analyze the content of the indexed data that includes the data corresponding to a particular life event of the user to determine a time in which the particular life event occurred. For example, based on the user statement "I got married when I was 25 years old," the system can analyze one or more other segments of indexed data to determine a year, date, and/or time when the user was married. The system may analyze the segments of indexed data to determine that the user was born in 1980, and in turn, the system can determine that the user was married in 2005. A data entry may then be stored in the system to indicate that the particular life event occurred at the time indicated by the content of the indexed data—which may be determined from a different segment of indexed data than the segment of data that included an indication of an occurrence of the particular life event.

Further, the sound retrieval module 900 can provide a graphical user interface (e.g., via one or more computing devices 120 or via a display provided on the wearable device 110) displaying a respective indication of each particular one of the pre-determined life events and a respective age of the individual when the particular pre-determined life event occurred. Continuing from the example above, the graphical user interface can include a chart, graph, or any other type of representation to indicate that the user was twenty-five when the user was first married, and the user was twenty-three when the user graduated from college. Various graphical user interfaces will be discussed in more depth below.

In some implementations, the pre-determined life events can include habits of the user or a third party, such as how much the individual exercises over a particular period of time (e.g., every day or week), when the individual typically wakes up or goes to bed, how many hours the individual sleeps, the types and how much food the individual consumes in a period of time, or how much time they spend performing a certain activity (e.g., work or a hobby) over a period of time, among others.

Moreover, in some implementations, the sound retrieval module 900 can receive at least one search criteria specifying, at least in part, one or more pre-determined life events of a third party. The search criteria can be a query input (e.g., via text or voice) by the user or selected from a selection list, including a filter enabled selection list. For example, the user may provide a search criterion indicating the life events of graduating from college and selling a first company for a particular individual (e.g., Elon Musk). In response, the sound retrieval module 900 can access one or more databases that include information related to the third party. For instance, the third party may also use the wearable sound capturing device (or similar device) to capture sound data surrounding the third party, and the captured sound data may be indexed and stored within the system. Additionally, the system may use one or more other databases (e.g., related to a search engine) and/or suitable big data and/or artificial intelligence techniques to determine information related to the pre-determined life events specified in the search criteria.

Further, the system can determine whether the accessed databases include data identifying information that is responsive to the at least one search criteria. If there is responsive data, then the system can collect or copy, from the accessed databases, the information defining the one or more pre-determined life events related to the search criteria. Finally, the system can generate a respective indication of each particular one of the pre-determined life events and a respective age of the third party when the particular pre-determined life event occurred. Continuing the previous example, the user may provide a search criterion indicating the life events of graduating from college and selling a first company for Elon Musk (i.e., the third party). In response, the system can access the databases, described above, to generate a response indicating that Elon Musk graduated from college in "1997," and sold his first company in "1999." In some implementations, if the particular third party has not experienced one or more of the pre-determined life events provided in the search criteria, then the generated response can indicate such information or state that the system cannot find an instance of the pre-determined life event for the particular third party.

Additionally, in some implementations, the "third party" can include more than one individual, and the user can select or input two or more particular individuals (e.g., Elon Musk and Steve Jobs), or the user can provide third party criteria without identifying particular third parties by name. For example, the third-party criteria may be specified as all individuals living in the states of California, Oregon, and Washington who are forty years old or older and who have an annual gross income of $1 million or more. Consequentially, the system would apply the search criteria specifying the one or more pre-determined life events to all individuals associated with the system that meet the third-party criteria. The generated response may be aggregate data of all of the individuals that meet the specified third-party criteria.

Further, the generated response can include a life arc display that can be provided at a computer user interface (e.g., via a display of one or more computing devices 120 or via a display provided on the wearable device 110). The life arc display can include a display comparison between the user and one or more third parties regarding each particular identified pre-determined life event (which may also include one or more habits described above). Additionally, the display comparison can present each particular identified pre-determined life event along with (optionally) a respective age of the user and the third party or a time period (e.g., a year) when each of the particular pre-determined life events occurred for the user and the third party, respectively. In some implementations, the comparison can be between one or more different third parties which may not include the user in the comparison (e.g., Elon Musk and Steve Jobs, or Steve Jobs and all individuals, for which the system includes data, born between 1950-1960). The graphical representation of the display comparison can include a graph, chart, timeline, table, or any other type of display that conveys the information regarding the particular pre-determined life events that are requested by the user in the search criteria.

Figure 10:
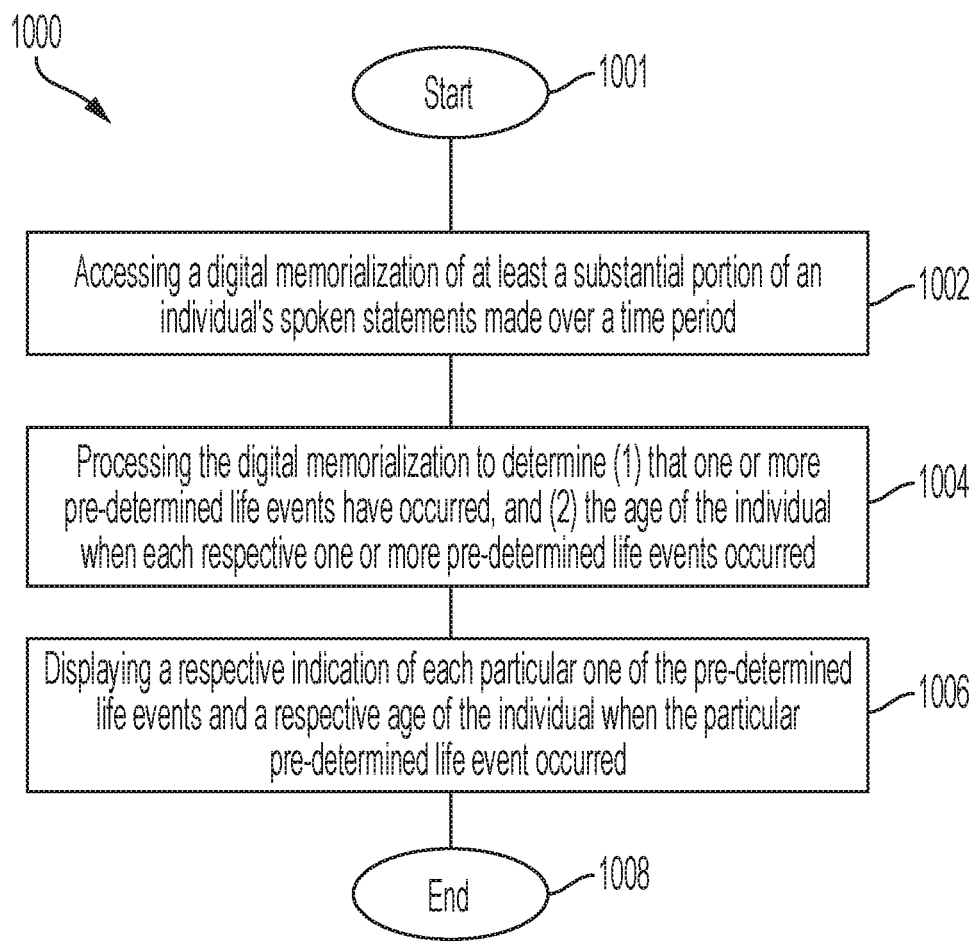
FIG. 10 is a flowchart that generally illustrates various steps executed by a life arc generation module according to a particular embodiment.

FIG. 10 shows an example process performed by a life arc generation module 1000, which may, for example, be executed by one or more computing devices of the system. In exemplary embodiments, a server (e.g., server 130) in conjunction with a wearable device (e.g., wearable device 110) and/or client computing device having a browser (e.g., computing device 120), may execute the life arc generation module 1000 through a network (e.g., network 140). In various exemplary embodiments, the life arc generation module 1000 may call upon other modules to perform certain functions. In exemplary embodiments, the software may be organized as a single module to perform various computer executable routines.

At step 1001, the system initiates the life arc generation module 1000. Next, at step 1002, the system, in executing the life arc generation module 1000, accesses a digital memorialization of at least a substantial portion of an individual's spoken statements made over a time period (e.g., seconds, minutes, hours, days, weeks, months, or years). The wearable sound capturing device facilitates monitoring and capturing sound data (e.g., a user's speech) and storing information, including the sound data. The wearable sound capturing device also includes one or more data collection devices (e.g., data collection device 320) that include one or more microphones (e.g., microphone 322) configured to capture sound data. The one or more microphones may be configured to capture sound data adjacent a user in at least a substantially continuous manner (e.g., 60% or other particular percentage of the user's statements).

The life arc generation module 1000 can then access a digital memorialization of the captured sound data. The system then segments the captured sound data, optionally converts the sound data to textual data (captured textual data), as described above, and/or indexes the captured sound and/or textual data to create indexed data (also described above). The digital memorialization can then be the captured sound data, captured textual data that has been converted from the captured sound data, both the captured sound data and captured textual data, and/or indexed data, which, in various embodiments, may include one or more indexes along with the captured sound data and/or captured textual data. The digital memorialization can include and/or consist of a digital recording of the captured sound data. In various embodiments, the digital memorialization may include only a portion of the captured sound data and/or captured textual data, and/or can include one or more segments of captured sound data and/or one or more segments of captured textual data. For example, the digital memorialization accessed by the system can include captured sound data of a substantial portion of an individual's (e.g., the wearer of the wearable sound capturing device) spoken statements made over a period of months.

At step 1004, the system, in executing the life arc generation module 1000, can process the indexed data to determine that one or more pre-determined life events have occurred. The pre-determined life events can include events such as marriage, birth of a child, acquiring a first job, particular career milestones (e.g., selling a company, creating an invention, being promoted), graduation from school, earning predetermined amount of money, and/or retiring, among others. In various embodiments, the life arc generation module 1000 can, from the digital memorialization, determine the age of the individual when each of the respective one or more pre-determined life events occurred. In particular embodiments, the life arc generation module 1000 can analyze the content of the digital memorialization to determine a time in which the particular life event occurred, as described above.

In some implementations, the pre-determined life events can include habits of the user or a third party, such as how much the individual exercises in a period of time, when the individual wakes up or goes to bed, how many hours the individual sleeps, the types and how much food the individual consumes in a period of time, or how much time they spend performing a certain activity (e.g., work or a hobby) over a period of time, among others. Additionally, in some implementations, the system may be adapted to allow a user to create customized life events for tracking by the system. For example, when the system does not include a selectable pre-determined life event, such as when a particular individual (e.g., Elon Musk) sold their first company and when the particular individual gets out of bed on average, the user can use the search criteria to search for these particular pre-determined life events of the user and/or one or more third parties.

At step 1006, the system, in executing the life arc generation module 1000, can display a respective indication of each particular one of the pre-determined life events and a respective age of the individual when the particular pre-determined life event occurred. The display can include a life arc display that can be provided at a computer user interface (e.g., via a display of one or more computing devices 120 or via a display provided on the wearable device 110). The life arc display can include a display comparison between the user and one or more third parties regarding each particular identified pre-determined life event identified from the digital memorialization. Additionally, in various embodiments, the display comparison can present each particular identified pre-determined life event along with a respective age of the user and the third party or a time period (e.g., a year) in which each of the particular pre-determined life events occurred for the user and the third party, respectively. In some implementations, the comparison can be between one or more different third parties. The graphical representation of the display can include a graph, chart, timeline, table, or any other type of display that conveys the information regarding the particular pre-determined life events that are identified by the user.

ILLUSTRATIVE EXAMPLES

Figure 11:
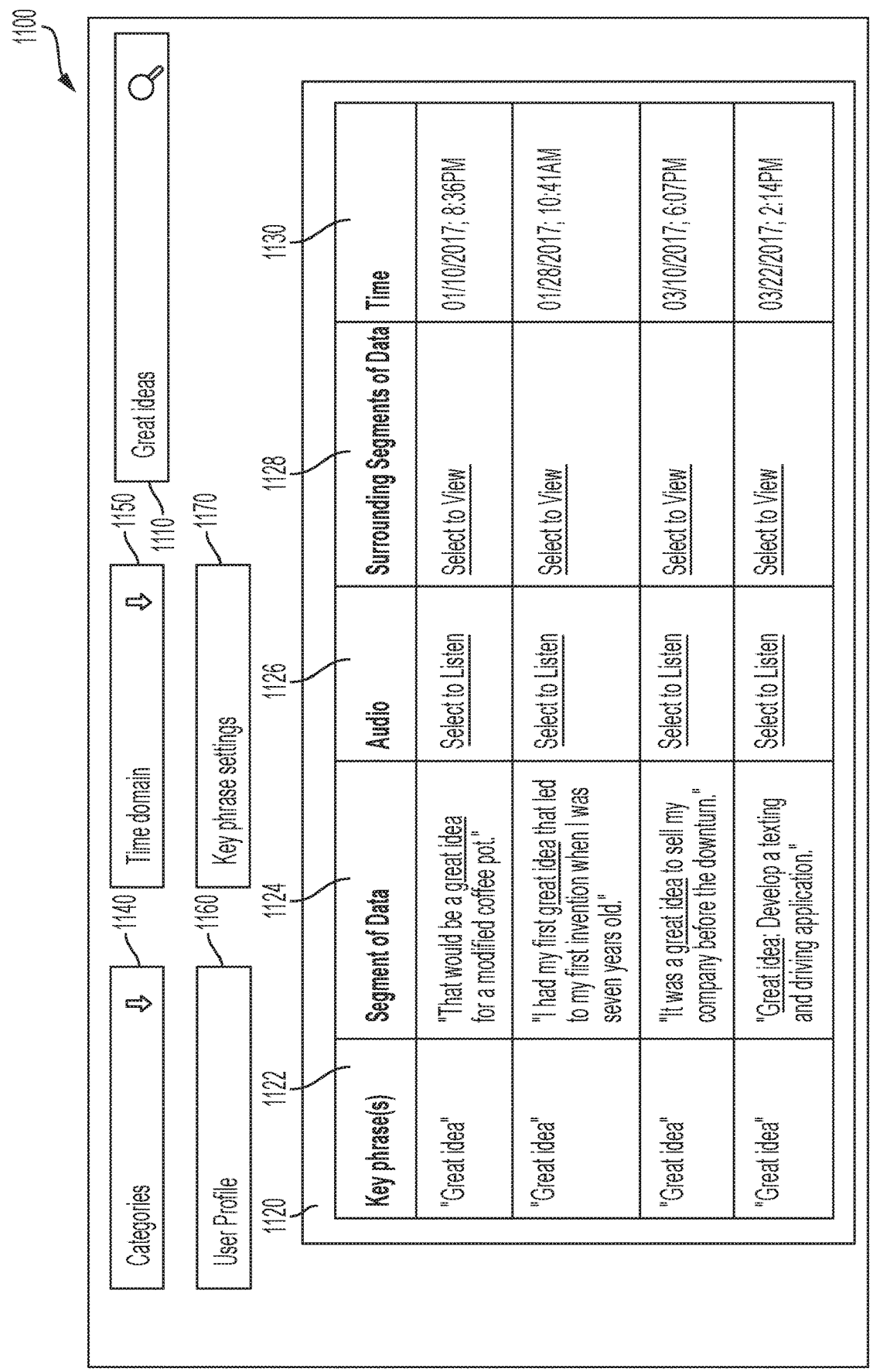
FIG. 11 is an example screen shot of a graphical user interface for facilitating retrieval of indexed data provided by a system according to a certain embodiment.

FIG. 11 depicts an example graphical user interface 1100 of the system facilitating retrieval of at least a portion of the indexed data. The indexed data can include one or more segments of captured sound data and/or one or more segments of captured textual data. In the present example, the user provides a search query 1110 for the key phrase "Great ideas," and the system accesses an index to retrieve segments of captured sound data and/or segments of captured textual data that include the key phrase "Great ideas." In the example, the query results 1120 indicate four instances within the indexed data that include the key phrase. The query results 1120 include five separate columns that provide information and options to the user.

In the present example, a key phrase column 1122 indicates the key phrase that was located within the indexed data; a data segment column 1124 indicates the full segment of data in which the key phrase was located; an audio retrieval column 1126 enables the user to select the "select to listen" option to listen to the captured sound data of the particular segment in which the key phrase was located; a surrounding segment column 1128 enables the user to select the "select to view" option to view the captured textual data, or listen to the captured sound data, of one or more surrounding segments of the data segment that includes the key phrase; and a time column 1130 indicates a time when data segment that includes the key phrase was captured as captured sound data.

Further, to continue the present example, a categories selection 1140 can be provided to enable the user to limit the key phrase search to one or more particular categories (e.g., a "work" category or "groceries" category). The system can provide a default set of categories, and in some implementations, the user can add or modify the set of categories. Moreover, the categories may be placed in one or more sub-categories (e.g., the "Grocery" category may be a sub-category of "Items to Purchase"). In turn, in various embodiments, the system can function as, and/or include a project management system that enables the user to search and prioritize particular items and events (e.g., based on the key phrases) among one or more categories. Additionally, the present example graphical user interface 1100 includes a time domain selection where the user can define the time period in which they would like to search for the use of a particular key word. For example, if the user limited the time domain to March of 2017, then the first two search results provided in the example search result 1120 section would not be included.

Moreover, the example graphical user interface 1100 includes a user profile 1160 selection where the user can update information related to their profile, such as setting one or more-time periods for the wearable sound capturing device to (or not to) capture sound data surrounding the user, create or modify categories or sub-categories, update the mechanisms for dividing the segments of captured sound data and/or captured textual data, among others. Additionally, the example graphical user interface 1100 includes a key phrase settings 1170 selection where the user can, for example, update information related to the key phrases stored within the system or view a history of previous key phrase searches performed by the user.

Figure 12:
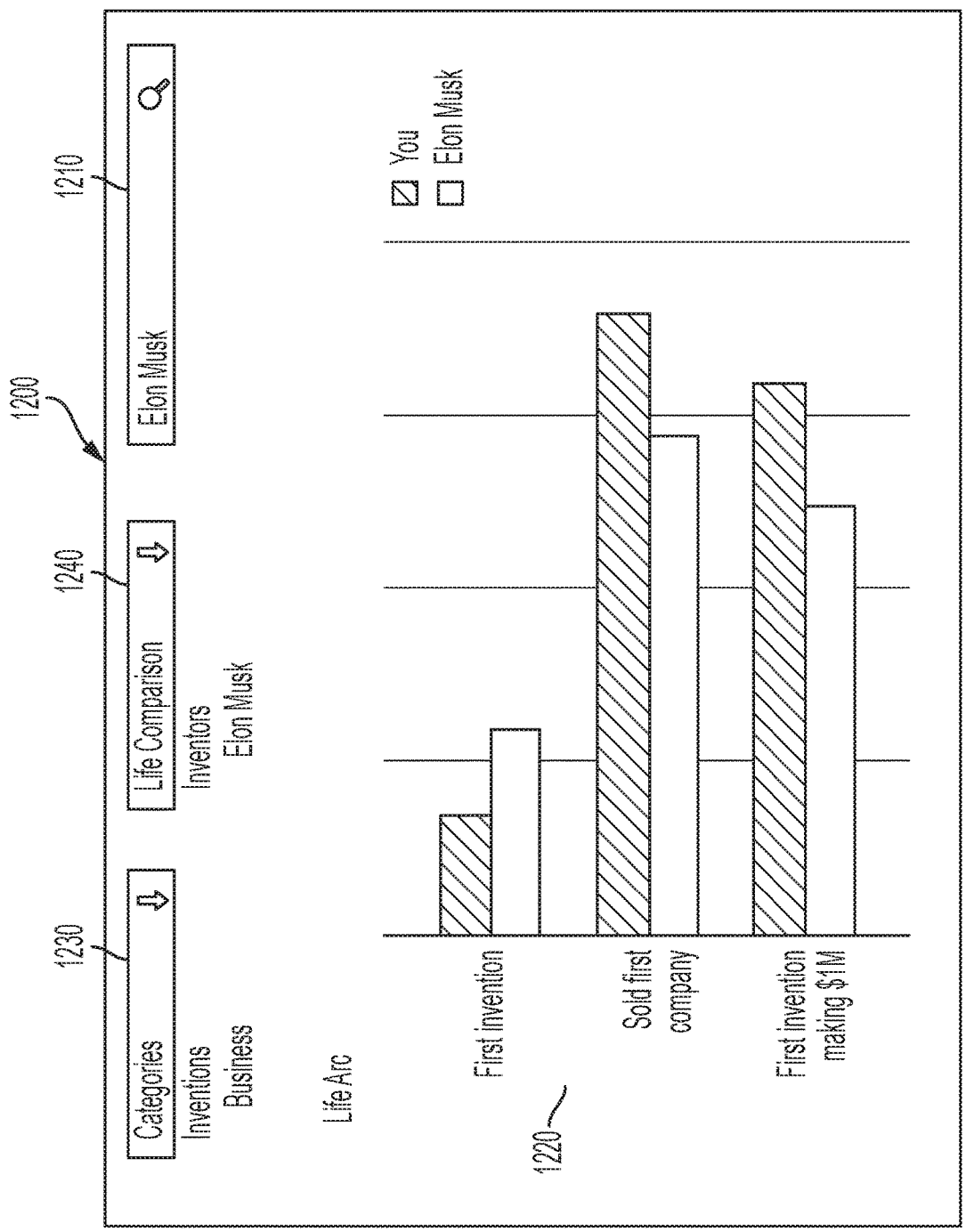
FIG. 12 is an example screen shot of a graphical user interface of a life arc display provided by a system according to a certain embodiment.

FIG. 12 depicts an example computer display of a life arc generated by the system. The life arc can include a display comparison between the user and one or more third parties regarding each particular identified pre-determined life event. Additionally, the life arc can present each particular identified pre-determined life event along with a respective age of the user and the third party or a time period (e.g., a year) when each of the particular pre-determined life events occurred for the user and the third party, respectively. The present example life arc 1200 includes a search query 1210 where the user can input particular pre-determined life events or classifications of one or more third parties. In the present example, the user input the search term "Elon Musk," which is used as the third party in the life arc display.

The example life arc 1200 includes a display area 1220 that includes a bar chart identifying the age of the user and the age of the third party, Elon Musk, when the identified pre-determined life events occurred, respectively, within the context of the user's and the third party's lives. The pre-determined life events of "first invention," "sold first company," and "first invention making $1,000,000 or more" may have been input or selected by the user as life events to compare, or the user may have defined the particular pre-determined life events included within each of the categories and/or sub-categories. In the present example, the user selected the category of "inventions," and a sub-category of "business," as shown in category selection 1230. The system, in the example, has the pre-determined life events shown in the display area 1220 that are associated with the user performed selections in the category selection 1230. The category selection 1230 may include, for example, a drop down selectable list that is further filtered based on the user's selections. Also, in the example life arc 1200, the user can select the third party or define criteria for the third party (e.g., over age 35 and live in the United States) in the life comparison selection 1240. The life comparison selection 1240 may also include one or more categories and/or sub-categories where the user may specify criteria for comparison. In the present example, the user has selected "inventors" as a category, and then selected "Elon Musk" as a selection within the category. Therefore, the current example of the life arc 1200 presents the life arc display comparison between the user and Elon Musk with regard to the pre-determined life events shown in the display area 1220.

Figure 13:
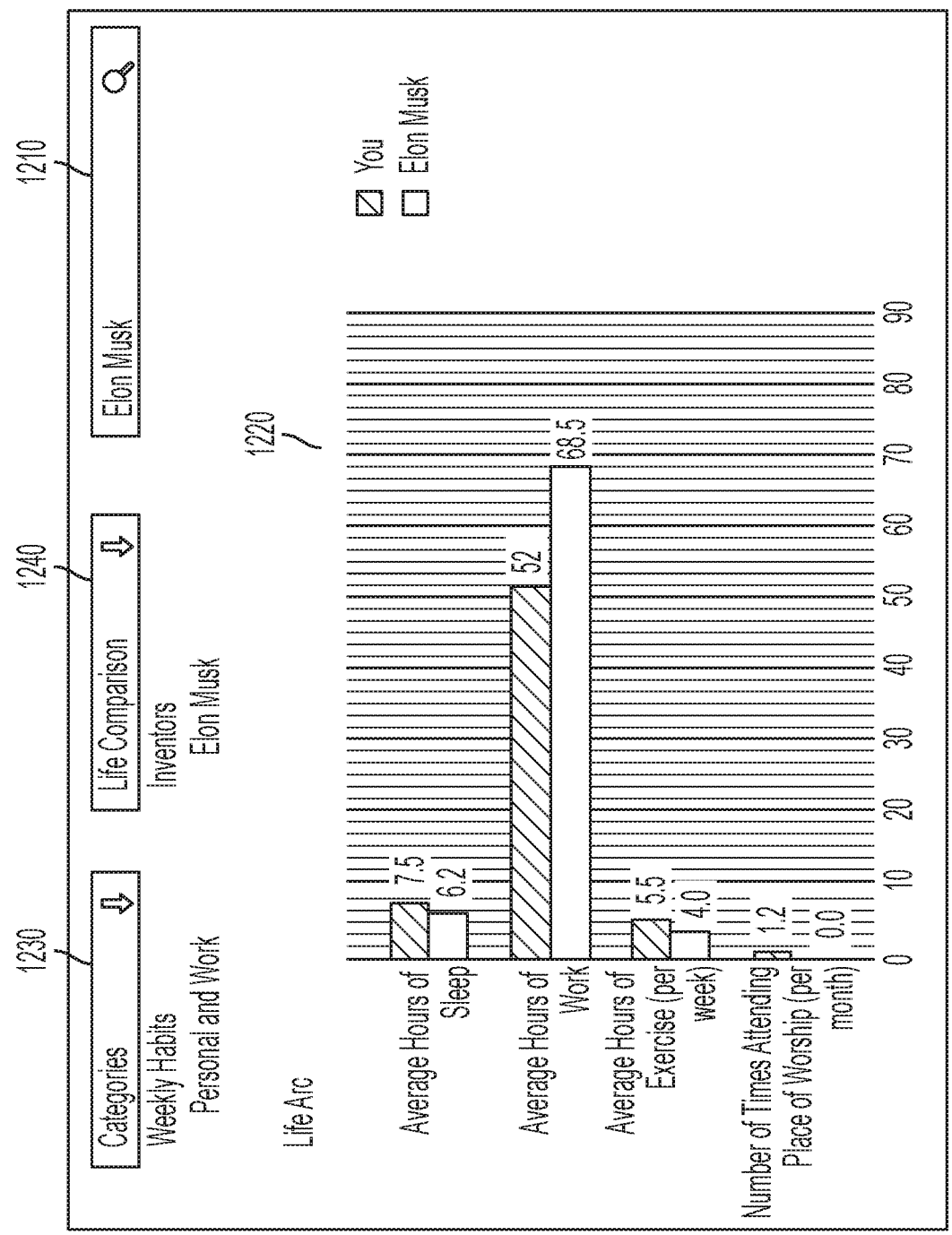
FIG. 13 is a second example screen shot of a graphical user interface of the life arc display, shown in FIG. 12.

FIG. 13 depicts an example graphical user interface 1300 of a life arc display. The present example life arc display 1300 is a different example of the life arc display 1200. In the present example life arc display, different pre-determined life events are compared between the user and the identified third party. The category selection 1230 in the present example is identified as "Weekly Habits," and the sub-category is selected or input as "personal and work." The pre-determined life events that are compared between the user and the third party, as shown in the display area 1220, are "average hours of sleep," "average hours of work," "average hours of exercise (per week)," and "number of times attending a place of worship (per month)." In various embodiments, these pre-determined life events can be automatically identified by the system or selected based on the sub-category selection of "personal and work," and/or the user can modify the pre-determined life events that are included in the display comparison (e.g., personalize the pre-determined life events that are provided in the display area 1220), or edit the pre-determined life events that are incorporated with each category or sub-category.

CONCLUSION

Various embodiments may include additional features beyond those described above. Many modifications and other embodiments of the invention will come to mind to one skilled in the art to which this invention pertains, having the benefit of the teaching presented in the foregoing descriptions and the associated drawings. Therefore, it is to be understood that the invention is not to be limited to the specific embodiments disclosed and that modifications and other embodiments are intended to be included within the scope of the appended claims. It should also be specifically understood that any steps executed within a set of computer-executable instructions would, at least in various embodiments, be executed by at least one computer processor associated with memory. Although specific terms are employed herein, they are used in a generic and descriptive sense only and not for the purposes of limitation.

What is claimed is:

1. A wearable sound capturing and retrieval system, comprising:
   at least one processor and memory; and
   a wearable sound capturing device, comprising:
      a data collection device that comprises at least one microphone configured for capturing sound data adjacent a user in at least a substantially continuous manner; and
      communication hardware for communicating the captured sound data to the at least one processor, wherein:
   the system is configured for:
      storing the captured sound data in memory;
      converting one or more segments of captured sound data to one or more segments of captured textual data;
      indexing data selected from a group consisting of:
         the one or more segments of captured sound data, and
         the one or more segments of captured textual data;
      facilitating retrieval by the user of at least a portion of the indexed data, wherein facilitating retrieval comprises:
         scanning the indexed data to identify one or more key phrases comprising one or more particular words;
         in response to identifying the one or more key phrases, retrieving one or more segments of indexed data that was communicated by the user at least about contemporaneously with the one or more key phrases;

after retrieving the one or more segments of indexed data, saving the one or more segments of indexed data to memory in association with one or more categories that is associated with the one or more key phrases; and facilitating access, by the user, to the indexed data;

processing the indexed data to determine, based at least in part on the one or more segments of captured sound data and the one or more segments of captured textual data, that one or more pre-determined life events have occurred and an age of an individual at which each of the respective one or more pre-determined life events occurred; and displaying, to the user, a respective indication of each particular one of the one or more pre-determined life events and a respective age of the individual at which the particular one of the one or more pre-determined life events occurred.

2. The wearable sound capturing and retrieval system of claim 1, wherein the system is further configured for:

receiving at least one search criteria specifying, at least in part, one or more pre-determined life events of a third party, wherein the third party is different from the user;

accessing one or more databases that include information of the third party;

determining whether the one or more databases include data that is responsive to the at least one search criteria;

collecting the data defining the one or more pre-determined life events of the third party based on data from the one or more databases; and generating a respective indication of each particular one of the pre-determined life events and a respective age of the third party when the particular pre-determined life event occurred.

3. The wearable sound capturing and retrieval system of claim 2, wherein the system is further configured for:

generating a life arc display to be provided on one or more computer user interfaces, the life arc display including a display comparison of each particular one of the one or more pre-determined life events and a respective age of the user and the third party when each of the particular pre-determined life event occurred for the user and the third party.

4. The wearable sound capturing and retrieval system of claim 2, wherein the third party comprises two or more individuals.

5. The wearable sound capturing and retrieval system of claim 1, wherein the system is further configured for:

searching the indexed data for data corresponding to one or more particular life events of the user, wherein the indexed data includes one or more of (i) the one or more segments of captured sound and (ii) the one or more segments of captured textual data;

determining that at least one segment of the indexed data includes data corresponding to a particular life event of the user;

determining, based on the content of the segment of the indexed data, that the particular life event occurred at a time in which the wearable sound capturing device captured the sound data corresponding to the segment of the indexed data;

storing a time stamp associated with the time in which the wearable sound capturing device captured the sound data corresponding to the segment of the indexed data; and storing an indication that the particular life event occurred at the time indicated by the time stamp.

6. The wearable sound capturing and retrieval system of claim 1, wherein the system is further configured for:

searching the indexed data for data corresponding to one or more particular life events of the user, wherein the indexed data includes one or more of (i) the one or more segments of captured sound and (ii) the one or more segments of captured textual data;

determining that the indexed data includes data corresponding to a particular life event of the user;

analyzing content of the indexed data that includes data corresponding to a particular life event of the user to determine a time in which the particular life event occurred; and storing an indication that the particular life event occurred at the time indicated by the content of the indexed data.

7. The wearable sound capturing and retrieval system of claim 1, wherein the system is further configured for:

for each of the one or more segments of captured sound data that was converted to one or more segments of captured textual data, associating the respective one or more segments of captured sound data with the one or more segments of captured textual data.

8. A computer system for generating a life arc for a particular individual, the system comprising:

at least one computer processor; and memory, wherein the system is adapted for:

accessing a digital memorialization of at least a substantial portion of an individual's spoken statements made over a time period of at least a plurality of months;

processing the digital memorialization to determine, based at least in part on the individual's spoken statements: (1) that one or more pre-determined life events have occurred; and (2) the age of the individual when each of the respective one or more pre-determined life events occurred; and displaying, to a user, a respective indication of each particular one of the pre-determined life events and a respective age of the individual when the particular pre-determined life event occurred.

9. The computer system for generating a life arc for a particular individual of claim 8, wherein the time period of at least the substantial portion of the individual's spoken statements is at least a plurality of years.

10. The computer system for generating a life arc for a particular individual of claim 8, wherein the digital memorization is a digital recording.

11. The computer system for generating a life arc for a particular individual of claim 10, wherein the digital recording is made using a wearable sound capturing device, wherein the wearable sound capturing device comprises:

a data collection device that comprises at least one microphone configured that is adapted for capturing the individual's spoken statements.

12. The computer system for generating a life arc for a particular individual of claim 8, wherein the substantial portion of the individual's spoken statements made over the time period comprises at least about 60% of individual's spoken statements.

13. The computer system for generating a life arc for a particular individual of claim 8, wherein displaying further comprises displaying, on a timeline, the respective indication of each particular one of the pre-determined life events and the respective age of the individual when the particular pre-determined life event occurred.

14. The computer system for generating a life arc for a particular individual of claim 8, wherein the one or more pre-determined life events include at least one event selected from a group consisting of: marriage, birth of a child, first job, graduation from school, earning predetermined amount of money, and retiring.

15. The computer system for generating a life arc for a particular individual of claim 8, wherein the system is further adapted for:
identifying, from the digital memorialization, one or more habits of the individual.

16. The computer system for generating a life arc for a particular individual of claim 8, wherein the system is further adapted for:
creating transcribed data by transcribing, from the digital memorialization, the individual's spoken statements made over the time period;
storing the transcribed data; and
analyzing the transcribed data to determine, based at least in part on the transcribed data: (1) that the one or more pre-determined life events have occurred; and (2) the age of the individual when each of the respective one or more pre-determined life events occurred.

17. The computer system for generating a life arc for a particular individual of claim 8, wherein processing the digital memorialization further comprises:
scanning the digital memorialization to identify one or more key phrases comprising one or more particular words;
in response to identifying the one or more key phrases, retrieving text that was spoken by the user at least about contemporaneously with the one or more key phrases; and
after retrieving the text, determining, based at least in part on the individual's spoken statements and the text that was spoken by the user at least about contemporaneously with the one or more key phrases: (1) that one or more pre-determined life events have occurred; and (2) the age of the individual when each of the respective one or more pre-determined life events occurred.

18. A computer system for generating a life arc for a particular individual, the system comprising:
at least one computer processor; and
a wearable sound capturing device, comprising:
a data collection device that comprises at least one microphone configured for capturing sound data adjacent a user in at least a substantially continuous manner, and at least one sensor configured for capturing user habit data identifying one or more routine acts performed by the user; and
communication hardware for communicating the captured sound data to the at least one processor, wherein:
the system is configured for:
storing the captured sound data in memory;
converting one or more segments of captured sound data to one or more segments of captured textual data;
processing the one or more segments of captured sound data and the one or more segments of captured textual data to determine: (1) that one or more pre-determined life events have occurred; and (2) a time period of the user's life when each of the respective one or more pre-determined life events occurred;
receiving life event data input by the user regarding: (1) one or more pre-determined life events that have occurred in the user's life; (2) a time period of the user's life when each of the respective one or more pre-determined life events occurred;
determining the user habit data defining one or more habits of the user, wherein the one or more habits comprise at least one habit selected from a group consisting of:
an average number of hours the user sleeps;
an average number of hours the user works;
an average number of times the user attends a particular type of event per month; and
a time when the user gets out of bed;
indexing data that includes data selected from a group consisting of:
the one or more segments of captured sound data,
the one or more segments of captured textual data,
the life event data provided by the user, and
the user habit data;
facilitating retrieval by the user of at least a portion of the indexed data;
accessing one or more databases that include information of a third party, wherein the one or more databases include (1) one or more pre-determined life events that have occurred in the third party's life; (2) a time period of the third party's life when each of the respective one or more pre-determined life events occurred; and (3) third party habit data that identifies one or more routine acts performed by the user; and
generating a life arc display to be provided on one or more computer user interfaces, the life arc display including a display comparison of: (1) each particular one of the pre-determined life events and a respective time period of the user's life and a third party's life when each of the particular pre-determined life events occurred for the user and the third party; and (2) the user habit data and the third-party habit data.

19. The computer system for generating a life arc for a particular individual of claim 18, wherein the third party comprises two or more individuals.

\* \* \* \* \*